(12) United States Patent
Tranchida et al.

(10) Patent No.: US 9,882,595 B2
(45) Date of Patent: Jan. 30, 2018

(54) HOUSING SYSTEM FOR PORTABLE ELECTRONIC DEVICES AND RELATED ACCESSORIES

(71) Applicants: Andrea Tranchida, Gravina di Catania (IT); Cristiano Gianluca Stella, Messina (IT)

(72) Inventors: Andrea Tranchida, Gravina di Catania (IT); Cristiano Gianluca Stella, Messina (IT)

( * ) Notice: Subject to any disclaimer, the term of this patent is extended or adjusted under 35 U.S.C. 154(b) by 173 days.

(21) Appl. No.: 14/430,180

(22) PCT Filed: Sep. 20, 2013

(86) PCT No.: PCT/IB2013/002061
§ 371 (c)(1),
(2) Date: Mar. 20, 2015

(87) PCT Pub. No.: WO2014/045102
PCT Pub. Date: Mar. 27, 2014

(65) Prior Publication Data
US 2015/0236745 A1 Aug. 20, 2015

(30) Foreign Application Priority Data
Sep. 21, 2012 (IT) .............................. CZ2012A0012

(51) Int. Cl.
*H04M 1/00* (2006.01)
*H04B 1/3888* (2015.01)
*H04R 1/10* (2006.01)

(52) U.S. Cl.
CPC ......... *H04B 1/3888* (2013.01); *H04R 1/1033* (2013.01)

(58) Field of Classification Search
CPC ........................... H04B 1/3888; H04R 1/1033
USPC ...................................................... 455/575.1
See application file for complete search history.

(56) References Cited

U.S. PATENT DOCUMENTS

| | | | |
|---|---|---|---|
| 6,633,770 B1 * | 10/2003 | Gitzinger ................. | A45F 5/00 224/191 |
| 8,811,646 B1 * | 8/2014 | Romeo ................ | H04R 1/1033 381/370 |
| 2008/0080732 A1 | 4/2008 | Sneed | |

(Continued)

FOREIGN PATENT DOCUMENTS

GB 2486215 A 6/2012

*Primary Examiner* — Raj Chakraborty
(74) *Attorney, Agent, or Firm* — Seed IP Law Group LLP

(57) ABSTRACT

A system includes a housing for a portable electronic device and a housing dedicated to house a winding mechanism for an earphone cable. The winding mechanism comprises a hollow base element, a cover element, a central sliding element, a spring, and a groove. The base element centrally includes a protrusion and the cover element has a base with a central hole corresponding to the protrusion and configured to allow exit of a first portion of the cable. The sliding element allows sliding of the cable and includes a base with a central hole between the base element and the covering element to form a pocket in which second and third portions of the cable are wrapped. The second portion is wrapped around the edge of the sliding element and the third portion is fixed inside the sliding element between a first hole and a second hole in the groove.

13 Claims, 24 Drawing Sheets

(56) References Cited

U.S. PATENT DOCUMENTS

| | | | |
|---|---|---|---|
| 2010/0160001 A1* | 6/2010 | Harris | H04M 1/0258 455/573 |
| 2011/0109259 A1 | 5/2011 | Choi et al. | |
| 2013/0237290 A1* | 9/2013 | Simmons, Jr. | H04B 1/3888 455/569.1 |

* cited by examiner

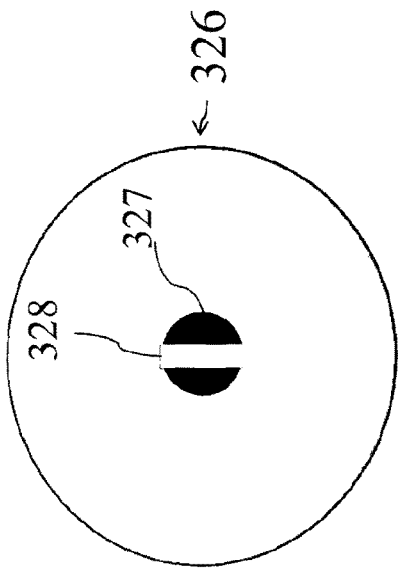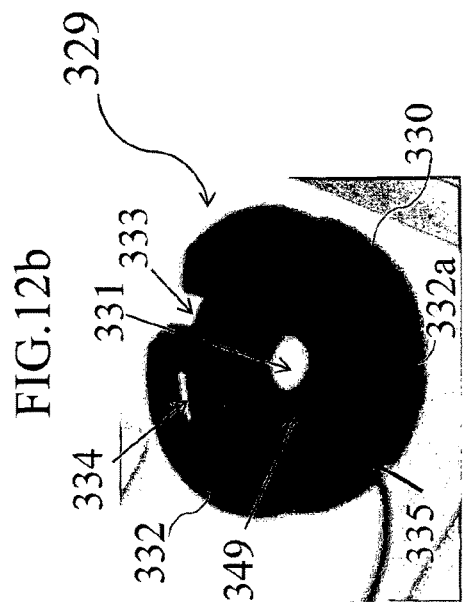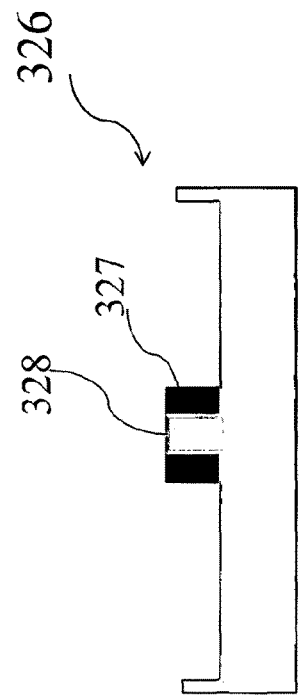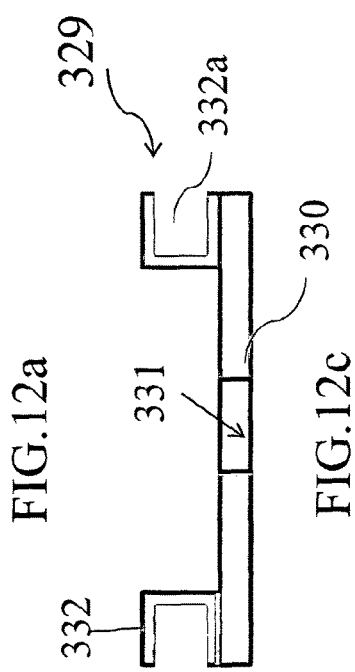
FIG.12

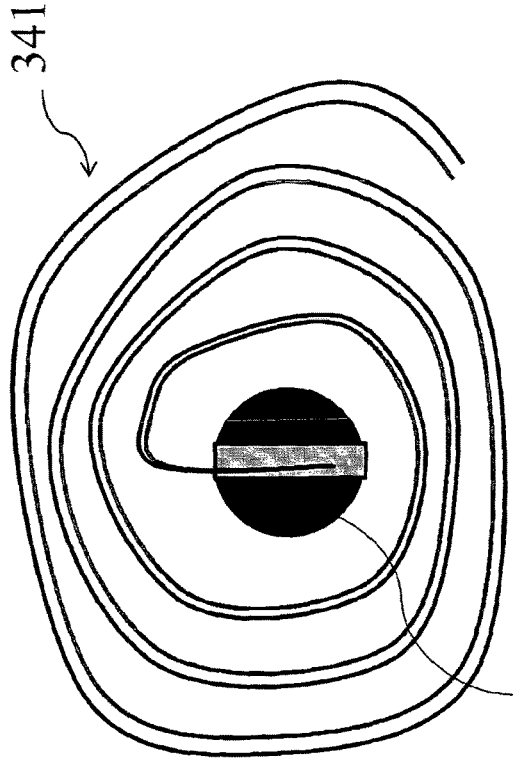
FIG.16a
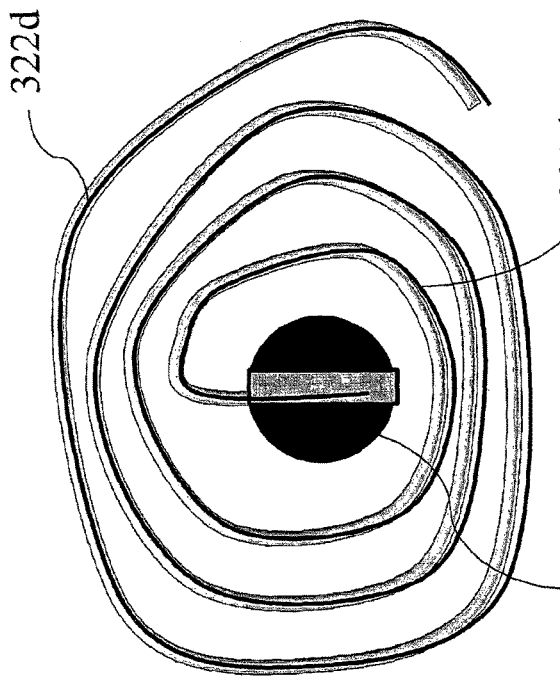
FIG.16b
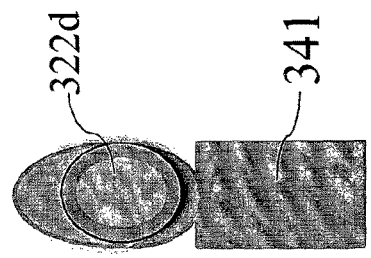
FIG.16c
FIG.16

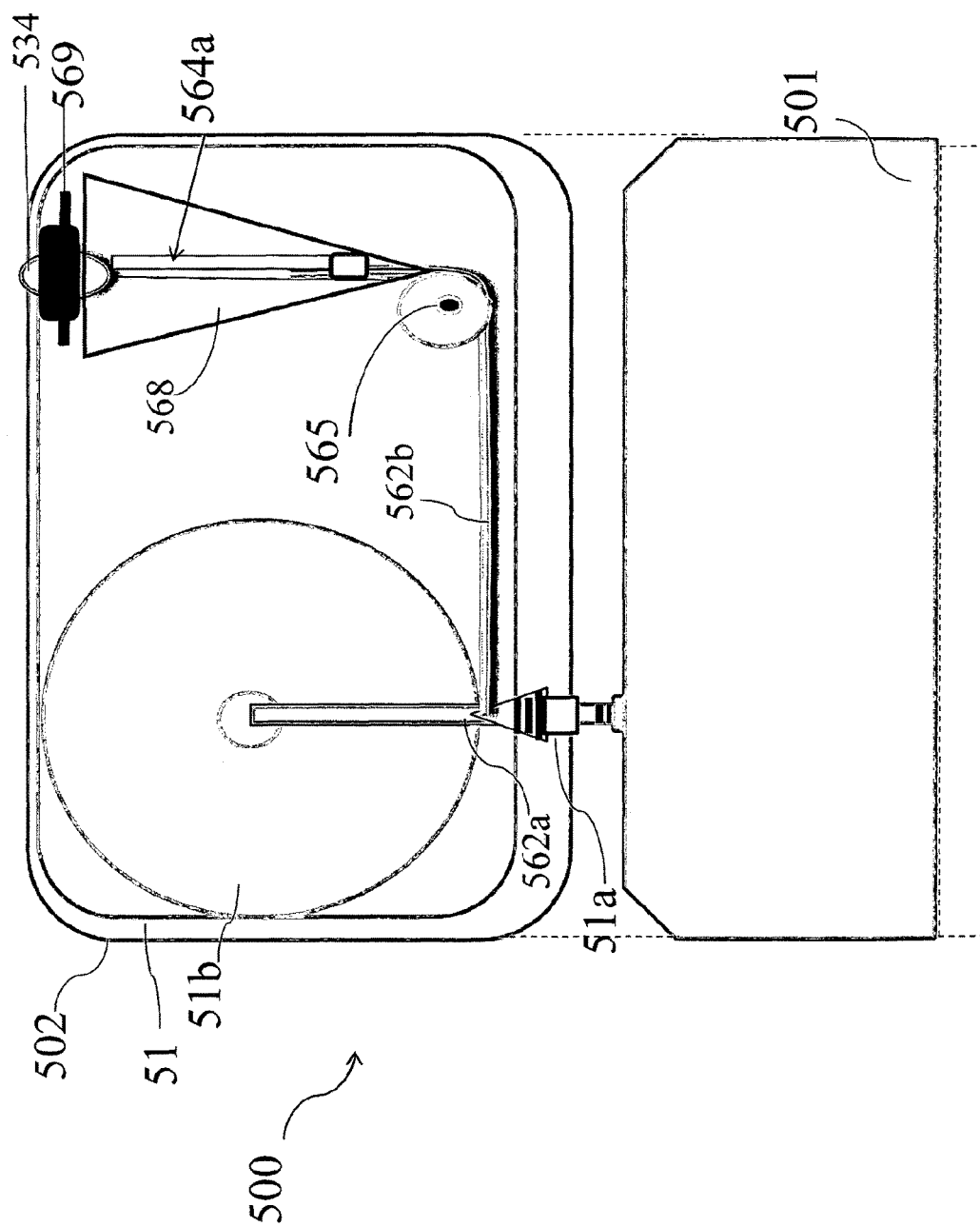

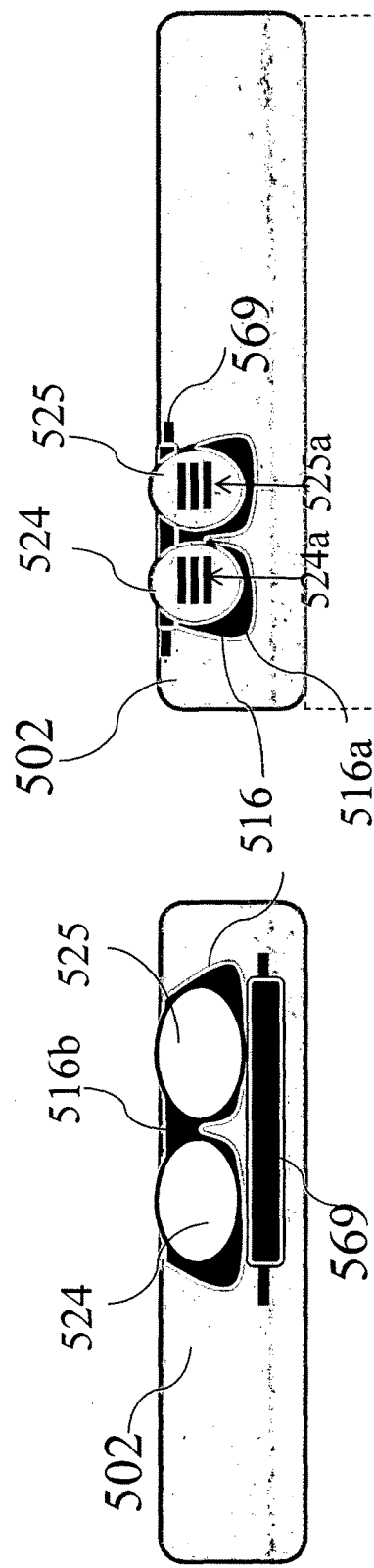

HOUSING SYSTEM FOR PORTABLE ELECTRONIC DEVICES AND RELATED ACCESSORIES

The present invention relates to a housing system for portable electronic devices and related accessories.

In particular, the present invention relates to a housing system for portable electronic devices and related accessories, such as the earphones wires or the wire of the power adapter or the USB cable of a UMTS mobile phone, such as the current Apple i-Phone and Samsung Galaxy, or such as audio-visual interactive web navigation systems, or electronic books, or telephone systems, commonly called Tablets, such as i-Pad and Kindle-fire, or portable audio and video systems, such as I-pod.

As you know, more and more people are using portable electronic devices such as cell phones, audio-visual interactive web navigation systems, e-books and telephone systems, commonly called Tablets. The problems of such devices concern different aspects. A first problem is due to the uncertainty in ensuring the health of users, in improving portability and in increasing their manageability, especially in conjunction with accessories, such as earphones provided with cable, USB cable, adapters. Another problem of the described portable devices and their accessories consist in that it is necessary to protect them well to guarantee their safety. Another problem they suffer is that their battery has a limited charge and this has determined the current market's request of the energy autonomy of these devices. At the end, the modularity and the possibility these devices have different functions are important at the same time.

Recently, some researchers have proven that a wide range of frequencies of the electromagnetic spectrum may have adverse biological effects causing damage of DNA brain cells. Therefore, to ensure the health of users it is necessary to limit the action of the radio frequency electromagnetic field generated by these devices, which, being used very close to the head, can cause damage to the human body and, in particular, to the brain. For this reason, in particular, in relation to the use of accessories such as headsets with cables, the phone and tablets manufacturers are suggesting to use these devices by placing them enough far away from the human body and the head. In addition, some manufacturers, supported by some scientists, are encouraging the use of earphones with cables, rather than wireless earphones. However, the earphone cables are very long, so it's not so easy to immediately answer a call or listen to the i-Pod, having first to unroll the long messy tangle of cables and connect the plug of the earphone cables to the phone or to a tablet or to any portable electronic device. The same problem arises when the USB cable is being used to charge the internal battery or to transfer data to an external device. On the other hand, these accessories are needed, although uncomfortable to wear inside jackets or bags. To overcome this problem, some manufacturers of earphones provide their customers with winding mechanisms easily able to slide to unroll the connection cables. However, current systems are still based on freehand winding mechanisms, both of the earphone cables and of the USB cable, and, therefore, with consequent limitations in manageability and portability.

A purpose of the present invention is to provide a housing system for portable electronic devices and related accessories having structural and functional characteristics that allow to overcome the limitations in manageability, portability, safety and energy autonomy which still exist according to the known technique.

According to the present invention a housing system for portable electronic devices and related accessories is provided, as defined in claim 1.

For a better understanding of the present invention is now described a preferred embodiment, purely as non-limiting example, with reference to the accompanying drawings, in which:

FIGS. 12a-12d show respectively a first schematic section view and a top view of a basic element of the winding mechanism of the earphones cables (FIG. 12a-12b), a schematic section view and an image of a sliding element for the sliding of the earphone cable of the winding mechanism (FIG. 12c-12d), according to the invention;

FIGS. 16a-16c show respectively schematic top views of a spring and of a spring-cable system and the section view of the spring-cable system of the winding mechanism of the earphone cables, according to the invention;

FIG. 20 shows a schematic three-dimensional view of a housing for a single mechanism for winding a single cable of a single earphone and the mechanism itself, according to the invention;

FIGS. 21a-21b show schematic three-dimensional top and rear views of the housing system of an electronic device provided with two earphones, according to the invention;

Figure 1:
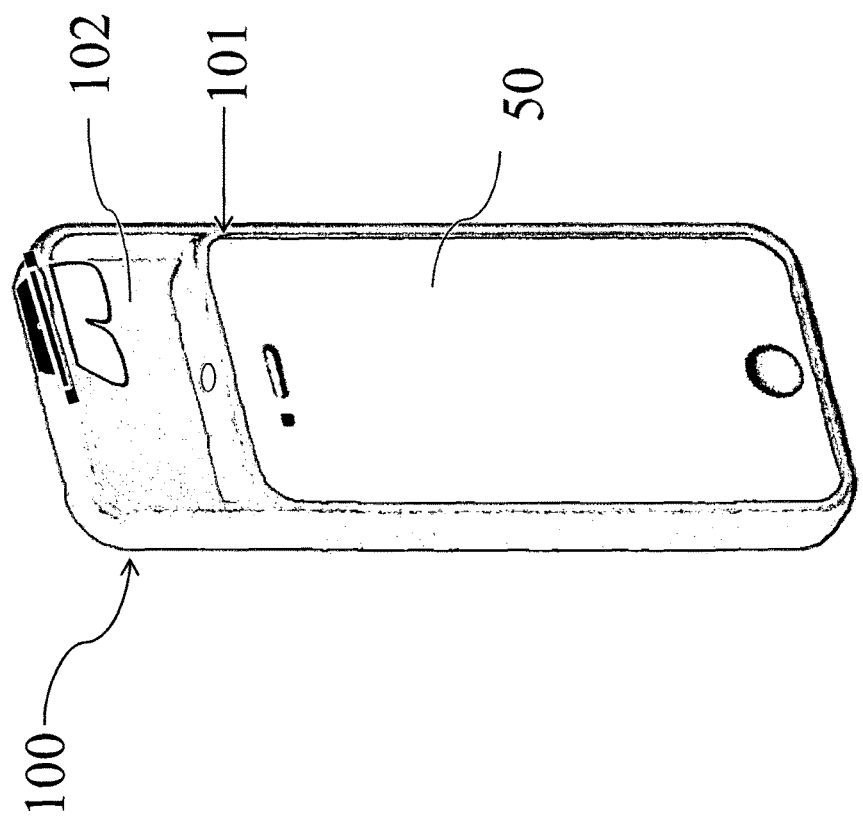
FIG. 1 shows a schematic three-dimensional view of a first embodiment of a housing system for portable electronic devices and related accessories, according to the invention.
Figure 2:
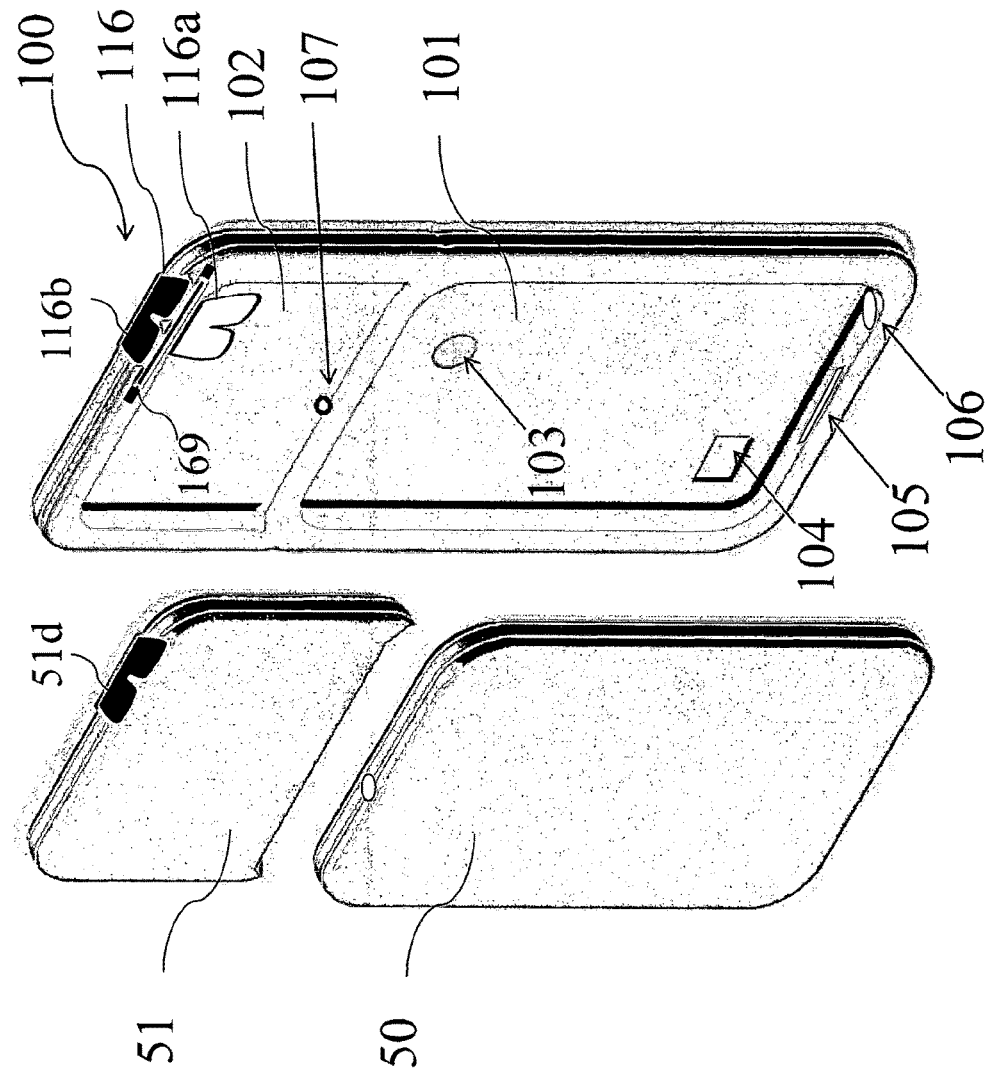
FIG. 2 shows a more detailed schematic three-dimensional view of the first embodiment of the housing system for portable electronic devices and related accessories, according to the invention.

With reference to these figures, and, in particular, to FIGS. 1-4, different embodiments of a housing system for portable electronic devices and related accessories are shown, according to the invention. More in particular, FIG. 1 shows a first embodiment of a system 100 for housing a portable electronic device and related accessories connectable to the device itself In more detail, the system 100 can be, just as an example, a shell of a portable device, such as a smart phone 50, and comprises a central housing 101 for the smart phone 50 and an upper housing 102 for accommodating a certain accessory of the smart phone 50. FIG. 2 shows the system 100 configured for comprising, in the central housing 101, the portable electronic device 50, and, in the upper housing 102, a removable or fixed accessory 51 of the smart phone 50 rigidly coupled to the system 100 and comprising, just as an example, a winding mechanism for the earphone cables of the portable electronic device 50.

According to an aspect of the invention, the housing 101 includes an upper hole 103 in correspondence of the lens of the device 50, such as a smart phone, a lower air inlet 104, a slot 105 for a possible smart phone USB port output and a hole 106 for the insertion of a possible stylus pen of the smart phone. In addition, the lower edge of the housing 102 comprises a hole 107 for connecting the earphones to the smart phone. Moreover, the housing 102 comprises contiguous rear slot 116a and top slot 116b, forming together a single angular top cavity 116 of the system 100 for housing and extracting the earphones placed inside the accessory 51, and a horizontal cylinder 169, integrated into the upper edge of the system 100, able to facilitate the sliding of the extractable earphones cables. In addition, the accessory 51 also includes an internal cavity 51d accommodating the extractable earphones, being aligned to the cavity 116 during the insertion of the accessory 51 in the housing 102.

Figure 3:
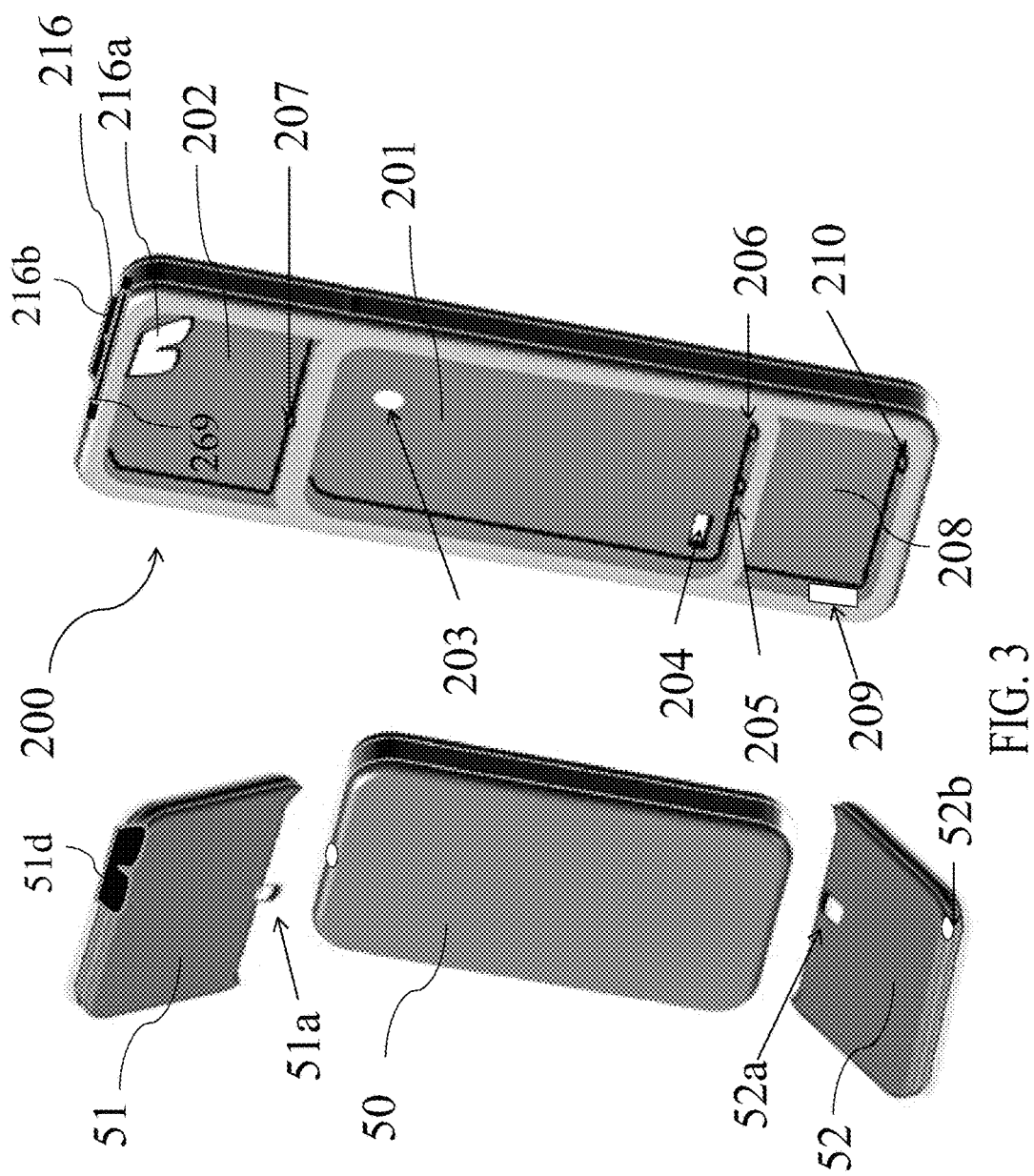
FIG. 3 shows a schematic three-dimensional view of a second embodiment of the housing system for portable electronic devices and related accessories, according to the invention.

FIG. 3 shows a second embodiment of the housing system for a portable electronic device and related accessories. In particular, the system 200 comprises a central housing 201 for the portable electronic device, such as the smart phone 50, with holes corresponding to those of FIG. 1, and an upper housing 202 dedicated to accommodate a first accessory 51 of the smart phone 50, for example comprising a winding mechanism for earphone cables of the portable electronic device. Moreover, the system 200 comprises a housing 208 for accommodating a second accessory 52 of the portable electronic device 50, for example comprising a winding mechanism of the smart phone USB cable. In addition, the housing 202 comprises contiguous rear slot 216a and top slot 216b forming together a single angular top cavity 216 of the system 200 for housing and extracting the earphones placed in the accessory 51, and a horizontal cylinder 269 integrated into the upper edge of the system 200 and able to facilitate the sliding of the extractable earphones cables. In addition, the housing 208 includes a side slit 209 for the USB port output and a hole 210 for inserting a stylus pen of the smart phone. FIG. 3 also shows that the accessory 51 and the accessory 52 are provided with appropriate plugs 51a and 52a for connection to the smart phone 50, respectively and specifically corresponding to the earphone plug and to a micro USB plug. Moreover, the accessory 51 comprises also an internal cavity 51d where the extractable earphones are placed, the cavity 51d being aligned to the cavity 216 during the insertion of the accessory 51 into the housing 202. The accessory 52 comprises an internal slot 52b for housing the possible tablet or smart phone stylus pen.

Figure 4:
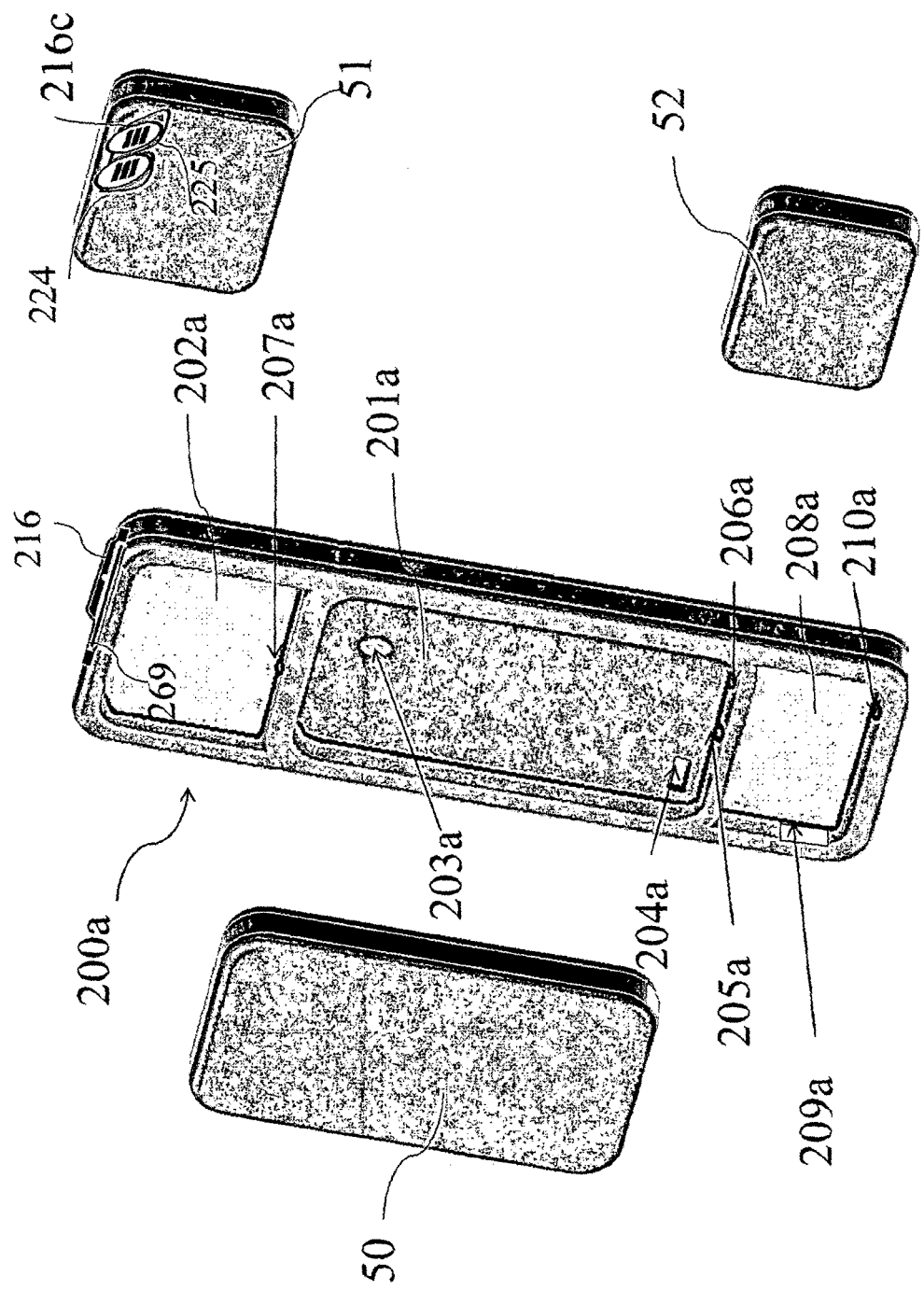
FIG. 4 shows a schematic three-dimensional view of a third embodiment of the housing system for portable electronic devices and related accessories, according to the invention.

According to an aspect of the invention, the housings for the accessories 51 and 52 are hollow, as shown in FIG. 4. In particular, the housing system 200a shown in FIG. 4 comprises a cavity 216, a hole 207a, a slot 205a, a hole 206a, a side slit 209a, a cavity 210a, similar to those of FIG. 3, hollow housings 202a and 208a, able to allow the insertion of the accessories 51 and 52 from the back of the housing system 200a. In particular, the FIG. 4 shows a three-dimensional rear view of the accessory 51 equipped with earphones 224 and 225 placed in a cavity 216c aligned to the cavity 216 during the insertion of the accessory 51 inside the housing system 200a, and is parallel to a scroll cylinder 269 shown in the FIG. 3. According to another aspect of the invention, the accessory 52 includes a winding mechanism for the USB cable and an adapter of the portable electronic device 50.

According to another aspect of the invention, the housing system for a portable electronic device and related accessories comprises housings for each accessory of the portable electronic device.

According to an aspect of the invention, the housing system for a portable electronic device and its accessories is a casing or a shell of the portable electronic device.

According to an aspect of the invention, the casing is made of rubber or plastic or any other similar flexible material.

According to another aspect of the invention, the casing is rigid.

According to a further aspect of the invention, the accessories are all removable.

Figure 5:
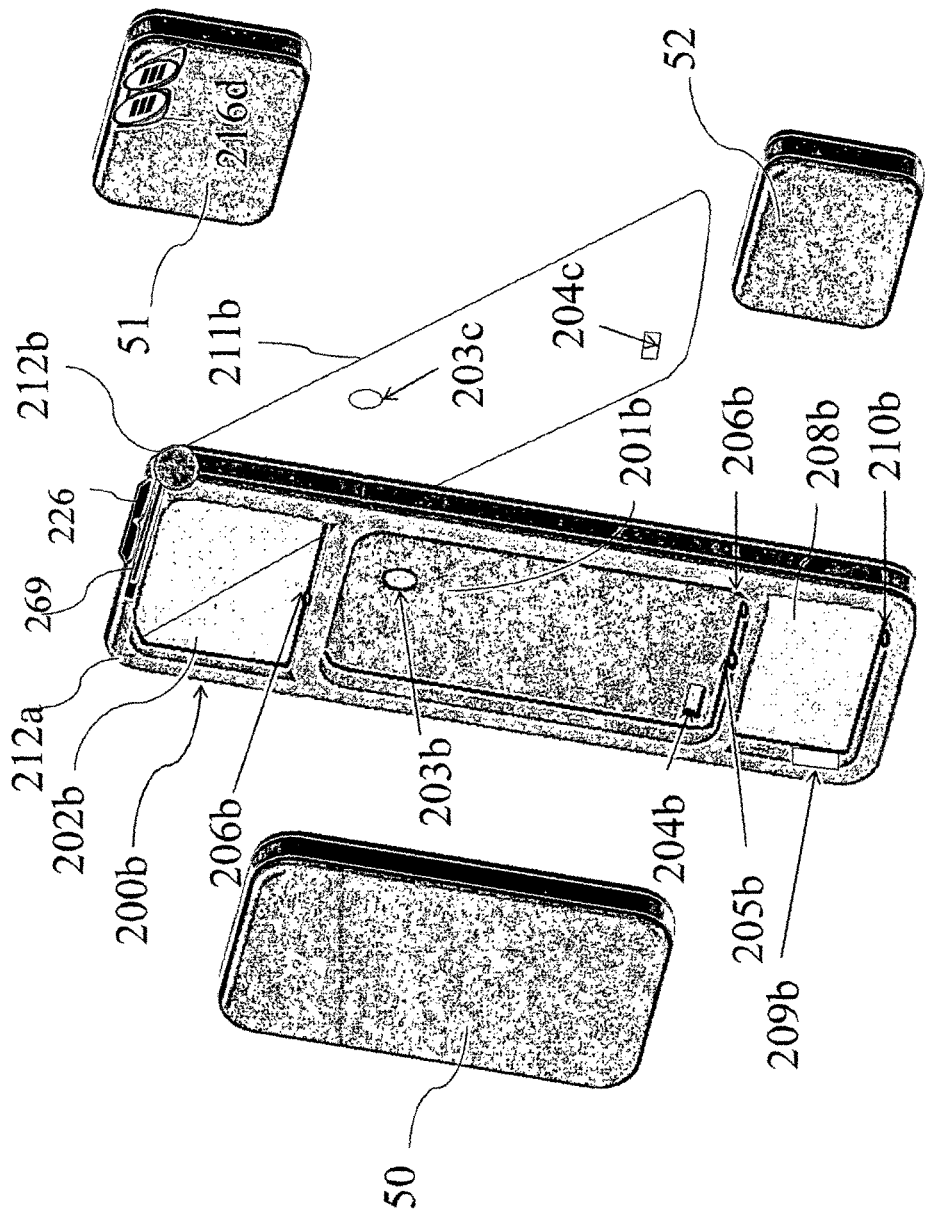
FIG. 5 shows a schematic three-dimensional view of a fourth embodiment of the housing system for portable electronic devices and related accessories, according to the invention.

Advantageously, according to the invention, the housing system or the shell of the portable device may comprise a movable part able to facilitate the extraction of the accessories and to be used also as supporting element of the portable device on a plane, for example as a lectern. By way of example, FIG. 5 shows the housing system 200b which is substantially equal to the system 200a and is additionally equipped with a rear cover 211 engaged by pins 212a and 212b to the upper edge of the system 200b. Therefore the cover 211 can rotate around the pins 212a and 212b for an angle comprised between 0° and 180° such that the cover 211 can be used as a support of the system 200b.

According to an aspect of the invention, the rear cover of the housing system of the portable electronic device may slide along the lateral edges of the housing system itself.

Figure 6:
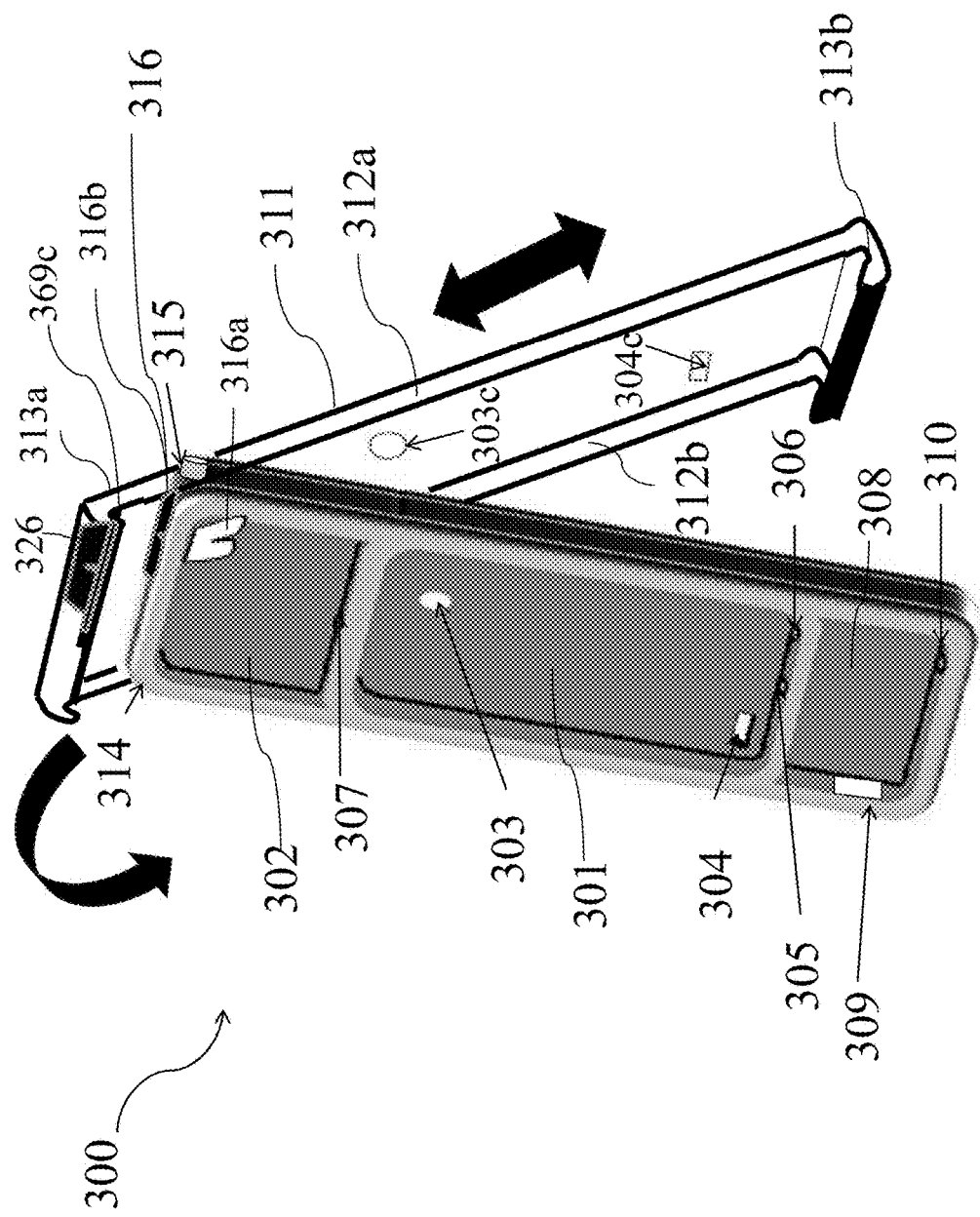
FIG. 6 shows a schematic three-dimensional view of a fifth embodiment of the housing system for portable electronic devices and related accessories, according to the invention.

By way of example, FIG. 6 shows the housing system 300 comprising a cover 311 comprising lateral internally grooved edges 312a and 312b and top and bottom edges 313a and 313b internally slightly folded as a hook to allow the interlocking of the cover 311 on the back of the housing system 300. The upper edge 313a is provided with a cavity 316b perfectly corresponding to the cavity 316 and is dedicated to house the earphones, not shown in the figure. The extraction of the earphones is facilitated by the integration in the same upper edge 313a of a scroll cylinder 369c for the scrolling of the earphone cables. The housing system 300 is equipped at the sides of the upper edge with fixed pins 314 and 315 configured for being inserted in a lockable manner within the lateral internally grooved edges 312a and 312b acting as binary of these pins 314 and 315. In this way, the cover 311 is enabled to slide vertically and to be rotated and folded down onto the front face of the housing system 300 so that it acts as a protective shield of the screen and of the entire portable electronic device, passing from a position of back cover to a position of front cover of the device.

Figures 7, 7A, 7B:
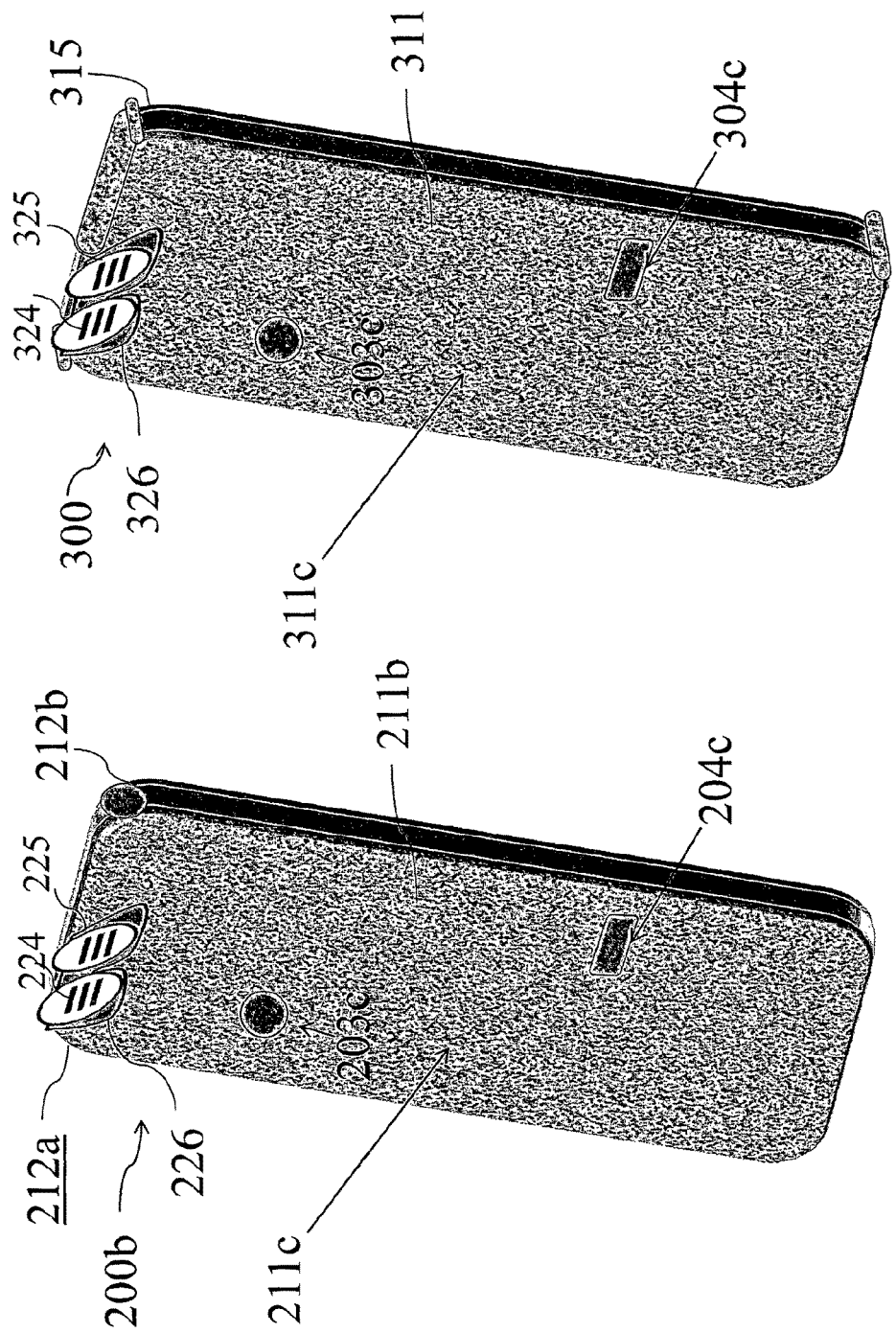
FIGS. 7a-7b show schematic three-dimensional rear views respectively of the fourth and of the fifth embodiment of the housing system for portable electronic devices and related accessories, according to the invention.

According to an aspect of the invention, the cover 311 may include photovoltaic cells for recharging the batteries of the electronic device. In particular, the FIGS. 7a and 7b show respectively the housing systems 200b and 300, covered by the rear covers 211 and 311 each being covered by a uniformly distributed photovoltaic film respectively 211c and 311c able to generate sufficient current to power the battery of the electronic device, such as the smart phone or the tablet, which gains a higher efficiency due to the greater exposed surface of the cover. For the system 200b of FIG. 5 the pins 212a and 212b and the lateral edges of the system 200b constitute the route of passage of the power cables directed from the integrated photovoltaic film to the battery via its protection and regulation circuit. For the system 300 of FIG. 6 the lateral internally grooved edges acting as rails 312a and 312b can be metal made so that they act as electrical contact areas between the output terminals of the formed photovoltaic cell and the power cables internal to the device and directed along the lateral edges of the system 300 to the battery terminals via its protection and regulation circuit.

The cover 211 also comprises a cavity 226 for housing the earphones of the device, a hole 203c in correspondence of the hole 203b of the system 200b and a slit 204c in correspondence of the slit 204b. The cover 311 also includes a cavity 326 for housing the earphones of the device 324 and 325, a hole 303c in correspondence of the hole 303 of the system 300 and a slit 304c in correspondence with the slit 304.

Advantageously, according to the invention, the mechanisms for winding the earphone cables or USB cable are manually or automatically removable and connectable to the portable device via magnetic or mechanical coupling connectors.

According to an aspect of the invention, the accessory 52 comprises a winding mechanism for the USB cable and an adapter of the portable electronic device.

Figure 8:
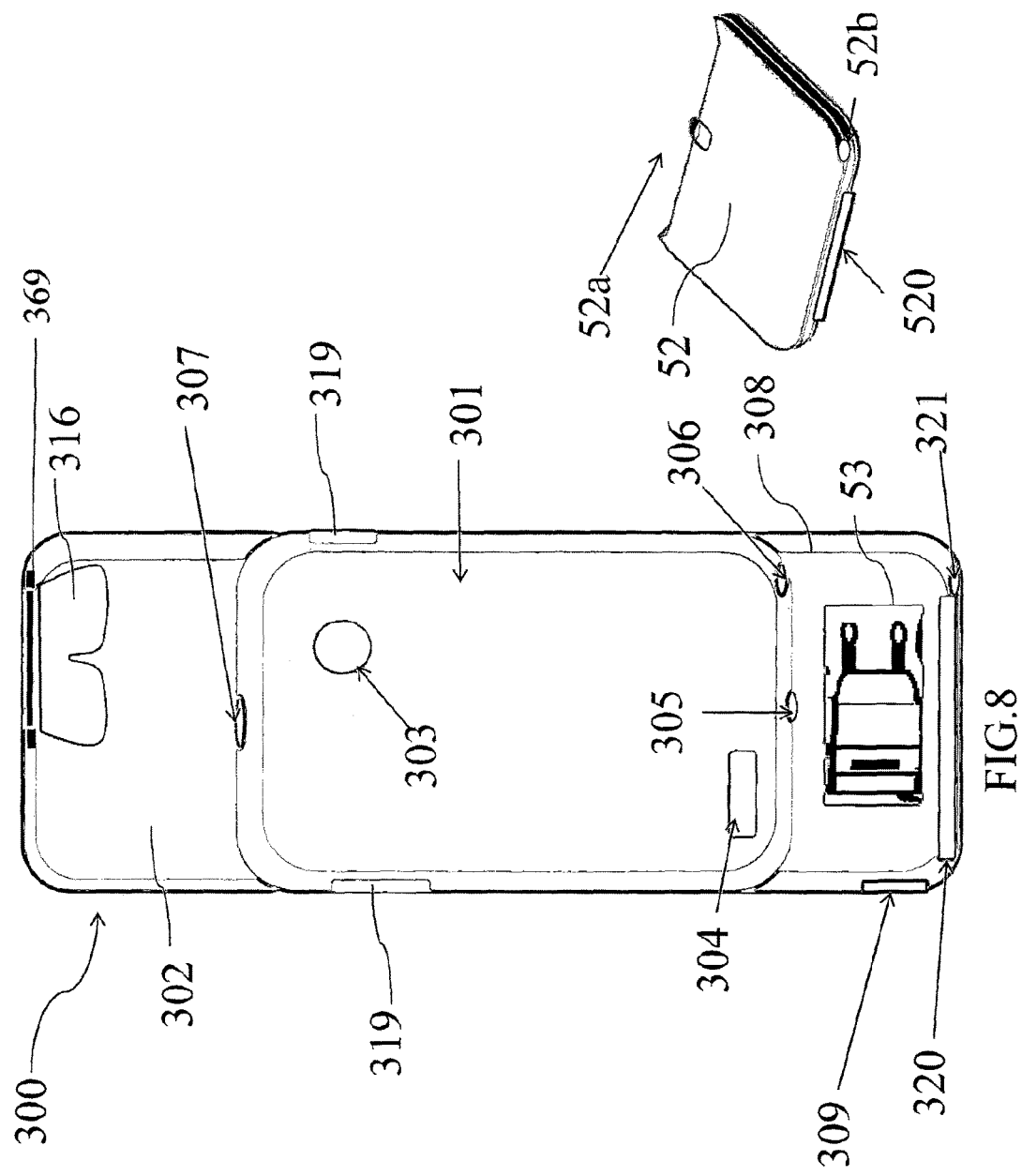
FIG. 8 shows a schematic front view of the second embodiment of the housing system for portable electronic devices and related accessories, specifically for a smart phone, according to the invention.

More in details, FIG. 8 shows a front view of the housing system 300 comprising, within the upper housing 302, the winding mechanism of the cables of the earphone 51 not shown in the figure. Moreover, the central housing 301 comprises, in addition to the hole 303, a hole 307 for the housing of the plug connection 51a of the accessory 51 to the electronic device 50, soft material-made lateral regions 319 placed in correspondence of the buttons of the device 50, so that the buttons can be pushed even if in the presence of the shell 300, and at least one hole 305 for inserting the micro USB plug 52a of the accessory 52 into the lower housing 308 of the system 300. The accessory 52 internally comprises, in addition to a winding mechanism of the USB cable, an adapter 53, shown schematically within the lower housing 308, and comprises a bottom slit 520 for the output of the power supply 53. The lower housing 308 also comprised a lateral hole 309 allowing the extraction of the USB plug and a bottom slit 320 for the extraction of the adapter 53 from the accessory 52. The lower housing 308 also comprises a hole 321 in correspondence of the hole 52b of the accessory 52 for the insertion of the stylus pen.

Figure 9:
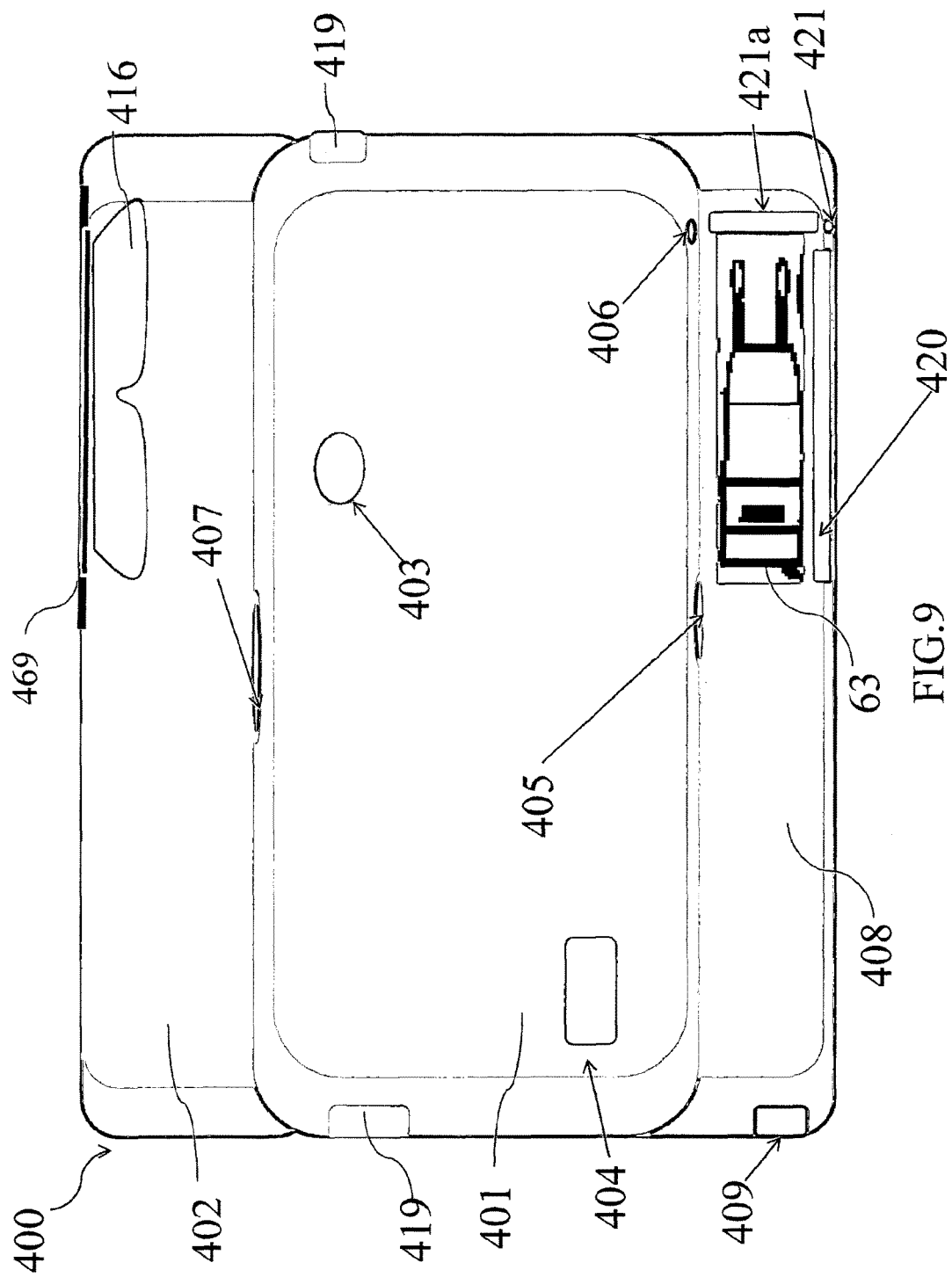
FIG. 9 shows a schematic front view of the second embodiment of the housing system for portable electronic devices and related accessories, specifically for a tablet, according to the invention.
Figure 10:
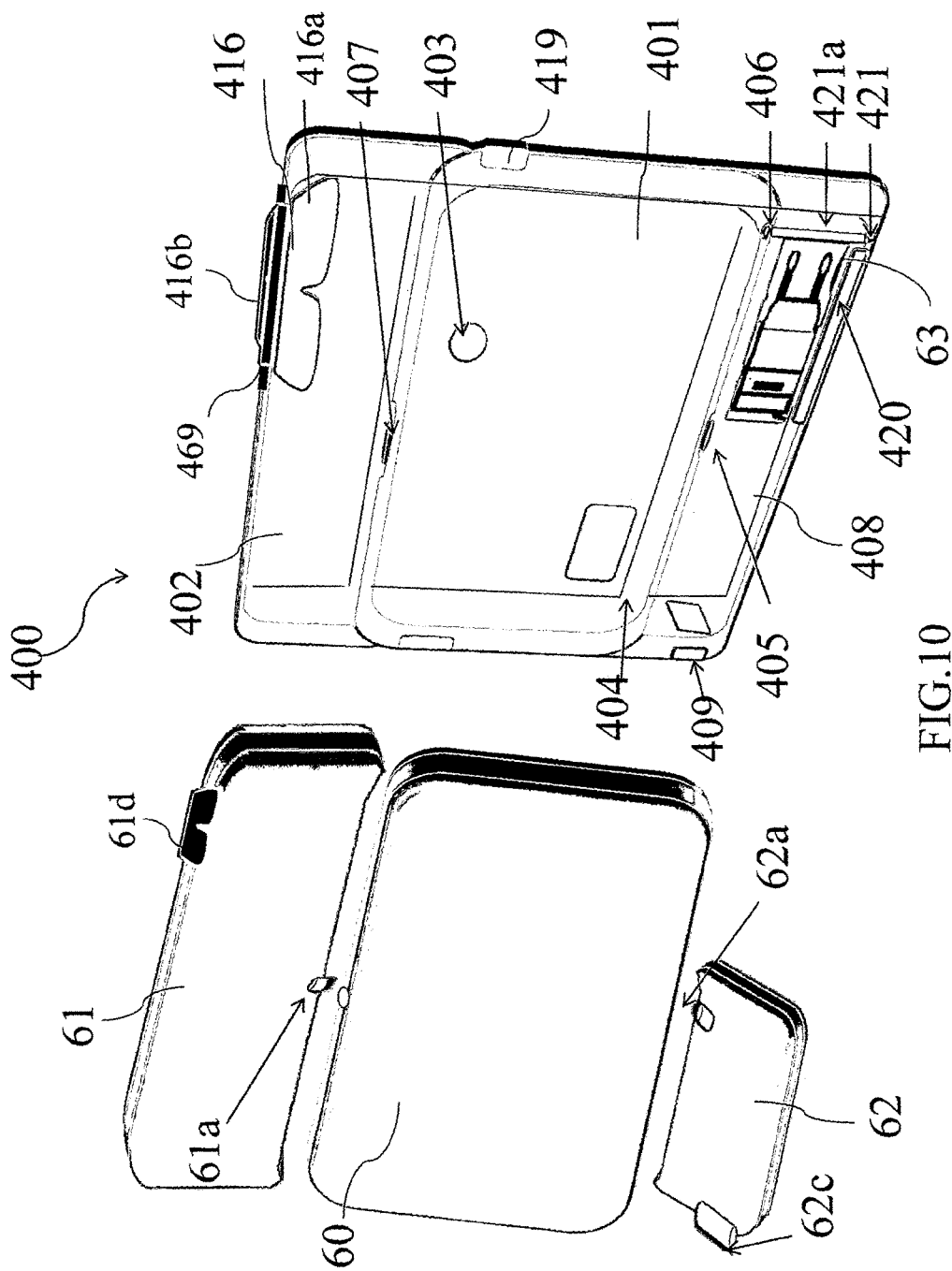
FIG. 10 shows a schematic three-dimensional view of the second embodiment of the housing system for portable electronic devices and related accessories, specifically sized for a tablet, according to the invention.

The FIGS. 9 and 10 show respectively a front view and a perspective view of a housing system 400 similar to the system 300, configured for a tablet 60 and tablet accessories 61, 62 and 63. In this case the adapter 63 is separated from the accessory 62 and is placed, for example, close to the accessory 62, inside the lower housing 408, which is equipped with an appropriate bottom slit 420 for its extraction from the housing 408 and with an appropriate lateral hole 409 for the extraction of the macro USB plug 62c of the accessory 62 having a winding mechanism for a USB cable. Any supplied stylus pen of the tablet will have a specific cylindrical hollow seat 421a between the holes 421 and 406. Moreover, as shown in FIG. 10, the accessory 61 comprising the mechanism for winding the earphone cables has a cavity 61d on the rear top edge configured for housing the extractable earphones not shown in this figure. The upper housing 402 comprises a cavity 416 correspondent to the cavity 61d and formed by a first rear cavity 416a and by a second adjacent top cavity 416b, the latter being arranged parallel to the cylinder 469 for the scrolling of the earphone cables, integrated along the upper edge of the housing system 400.

Figure 10A:
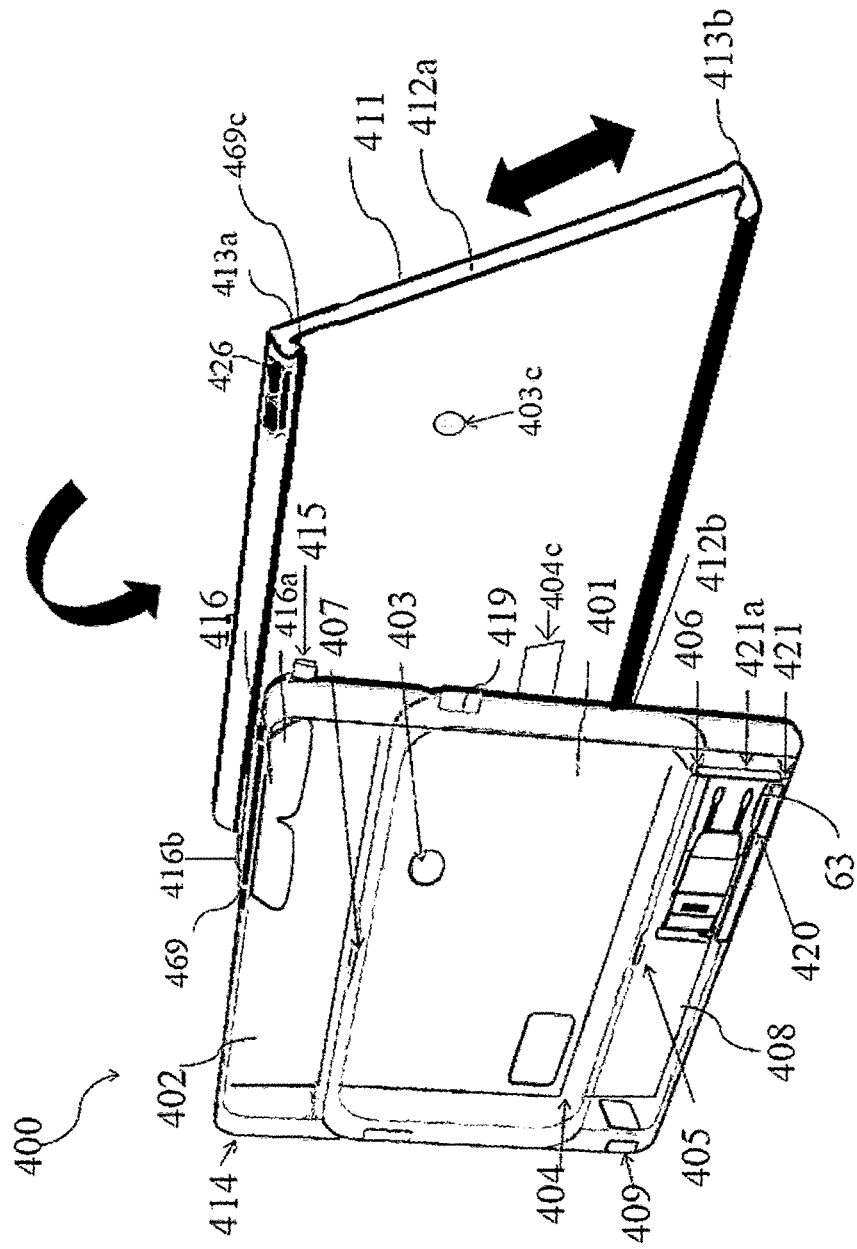
FIG. 10a shows a schematic three-dimensional view of the fifth embodiment of the housing system for portable electronic devices and related accessories, specifically sized for a tablet, according to the invention.

According to an aspect of the invention, the system 400 can comprise also a cover to protect the tablet. By way of example, the FIG. 10a shows the housing system 400 comprising a cover 411 comprising lateral internally grooved edges 412a and 412b and top and bottom edges 413a and 413b internally slightly folded as a hook to allow the interlocking of the cover 411 on the rear of the housing system 400. The upper edge 413a being provided with an opening 426 perfectly corresponding to the cavity 416b and dedicated for housing the earphones, not shown in the figure. The extraction of the earphones is facilitated by the integration in the same upper edge 413a of a scroll cylinder 469c for the scrolling of the earphone cables. The housing system 400 is equipped at the sides of the upper edge with fixed pins 414 and 415 configured for being inserted in a lockable manner within the lateral internally grooved edges 412a and 412b acting as rails of these pins 414 and 415. In this way, the cover 411 is enabled to slide vertically and to be rotated and folded down onto the front face of the housing system 400 so that it acts as a protective shield of the screen and of the entire portable electronic device, passing from a position of back cover to a position of front cover of the device. The cover 411 also comprises also a cavity 426 for housing the earphones of the device, a hole 403c in correspondence of the hole 403 of the system 400 and a slot 404c in correspondence of the slot 404.

According to another aspect of the invention, the cover 411 may include photovoltaic cells for recharging the batteries of the electronic device. In particular, the cover 411 can be covered by a uniformly distributed photovoltaic film able to generate sufficient current to power the battery of the tablet, which gains a higher efficiency due to the greater exposed surface of the cover. The lateral rails 412a and 412b can be metal made so that they act as electrical contact areas between the output terminals of the formed photovoltaic cell and the power cables internal to the device and directed along the lateral edges of the system 400 to the battery terminals via its protection and regulation circuit.

According to an aspect of the invention, the accessory 51 or 61 comprised within the housing 302 or 402 of the housing system 300 or 400 for a portable electronic device 50 or 60 and related accessories comprise a winding mechanism for each earphone cable.

According to another aspect of the invention, the accessory 51 or 61 comprised within the housing 302 or 402 of the housing system 300 or 400 for a portable electronic device 50 or 60 and related accessories comprise a single winding mechanism for both earphone cables.

Figure 11:
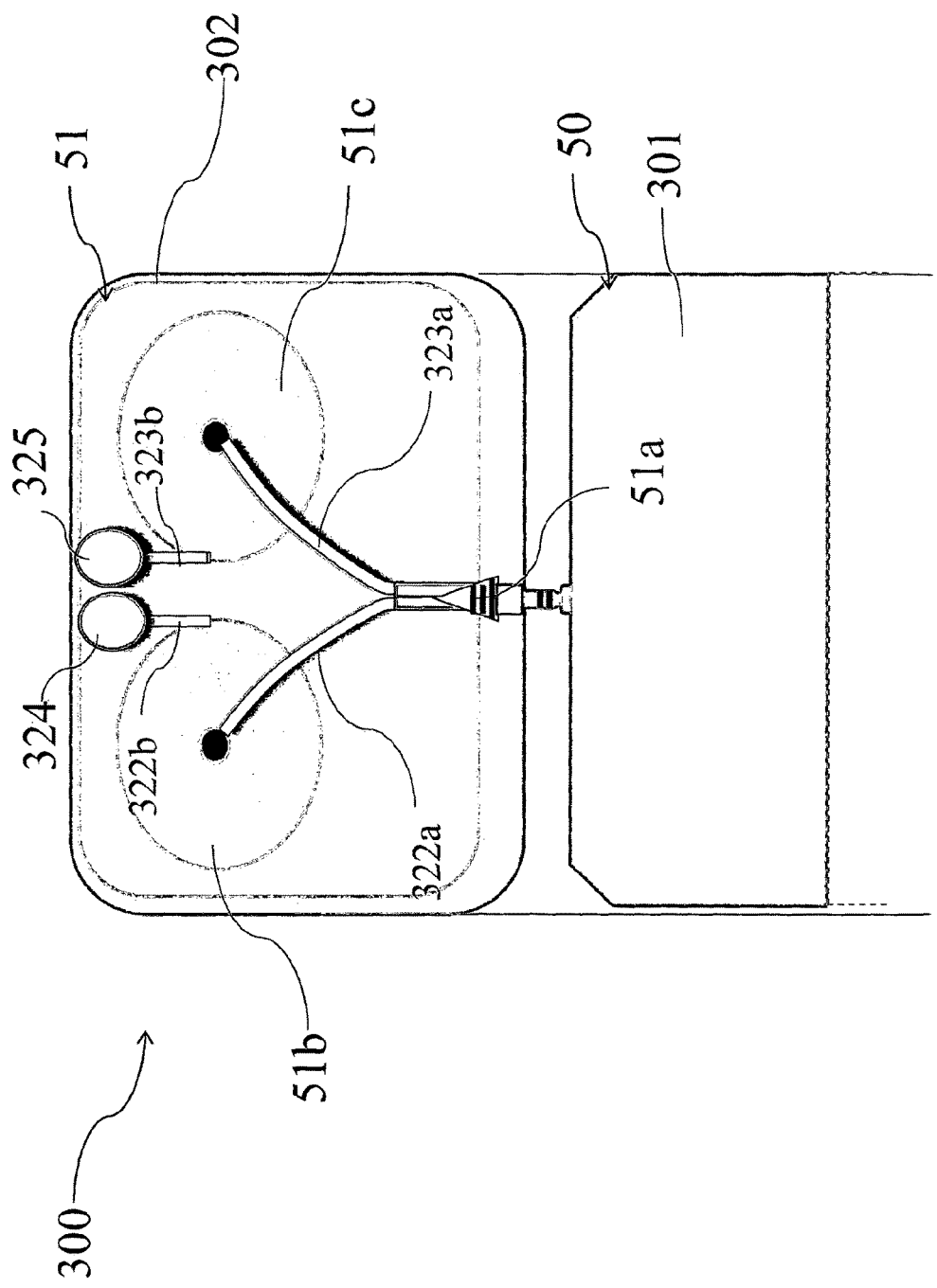
FIG. 11 shows a schematic front view of the housing system for portable electronic devices and related accessories and of a specific accessory comprising a winding mechanisms for earphone cables, according to the invention.

By way of example, the FIG. 11 shows the housing system 300 for the smart phone 50, comprising, within the upper housing 302, the accessory 51 comprising two winding mechanisms 51b and 51c for rewinding, respectively, a first earphone cable 322 and a second earphone cable 323 and a plug 51a for connecting the cables to the smart phone 50, or, more generally, to the portable electronic device 50. In particular, the first earphone cable 322 extends from the winding mechanism 51b to the plug 51a for a first portion 322a and the second earphone cable 323 extends from the winding mechanism 51c to the plug 51a for a first portion 323a. Moreover, the housing 302 comprises also the earphones 324 and 325 connected to each winding mechanism by means of a second portion of the cable respectively 322b and 323b.

According to an aspect of the invention, the plug 51a is positioned in correspondence of a central region inside the portable electronic device.

Here's following a description of the winding mechanism of each earphone cable, just as an example. In particular, the winding mechanism 51b is described and this description is similarly applicable to the winding mechanism 51c.

The winding mechanism 51b comprises a hollow cylindrical base 326 provided centrally with a cylindrical protrusion 327 having a central screw groove 328, as it is shown respectively in a section view in the FIG. 12a and in a top view in the FIG. 12b. Furthermore, the winding mechanism 51b comprises a central circular element 329 for the sliding of the first earphone cable, shown in a section view in the FIG. 12c and in a perspective view in the FIG. 12d, the central circular element 329 being positioned above the hollow cylindrical base element 326. This sliding element 329 has a circular base 330 with a central hole 331 and a circular edge 332 having exteriorly a groove 332a. More in details, the circular edge 332 of the sliding element 329 comprises an opening 333, shown in the FIG. 12d, for inserting from outside a spring not shown in the figure. Furthermore, a first hole 334 useful for blocking one end of the spring fixed to the sliding element 329 is provided on the wall of the edge 332 at a predetermined distance from the opening 333. Finally, the wall of the edge 332 is provided, for example in a position diametrically opposite to the opening 333, with a second hole 335 useful to guide the earphone cable inside the sliding element 329.

Figure 13:
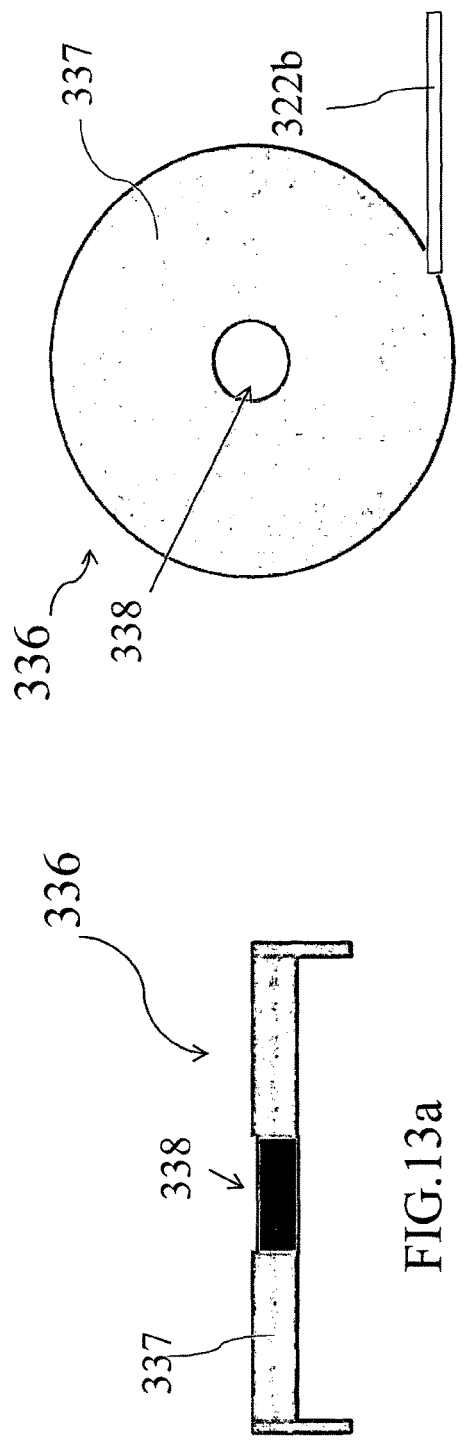
FIGS. 13a-13b show respectively a schematic section view and a schematic top view of a covering element of the winding mechanism of the earphone cables, according to the invention.

Moreover, as shown in section view of the FIG. 13a and in top view of the FIG. 13b, the winding mechanism 51b comprises a cover element 336 having a circular base 337 with a central hole 338, useful for the passage and guiding of the double or single earphone cables from the cylindrical protrusion 327 to the plug 51a.

Figure 14:
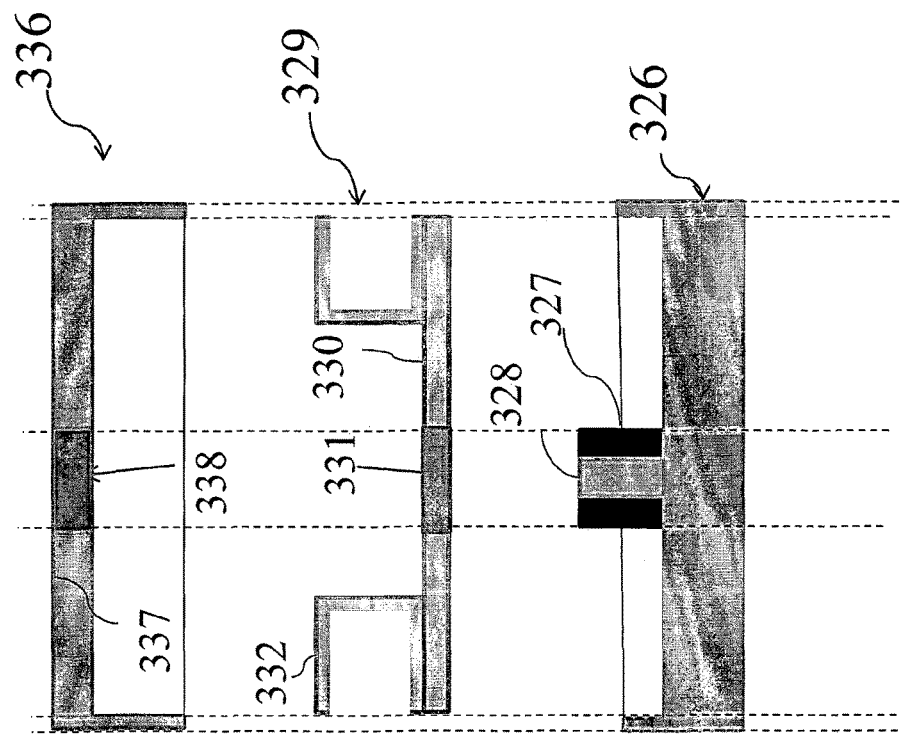
FIG. 14 shows a schematic section view of the assembling parts forming the winding mechanism of the earphone cables, according to the invention.
Figure 15:
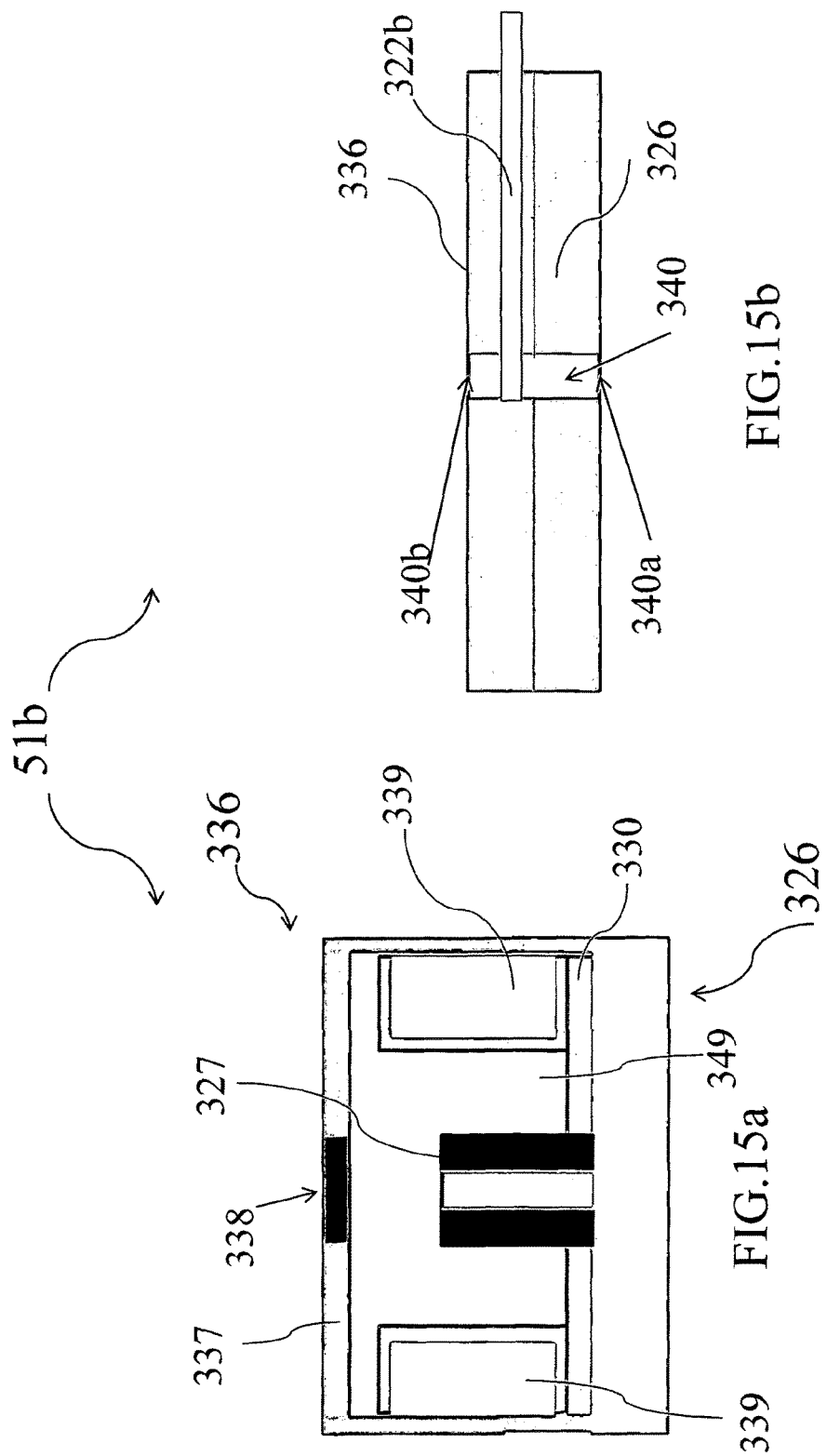
FIGS. 15a-15b show respectively schematic section and bottom views of the winding mechanism of the earphone cables, according to the invention.

The FIG. 14 shows a schematic section view of the overlapped three parts 326, 329 and 336 comprised in the winding mechanism. The sliding element 329 is sandwiched between the circular base element 326 and the cover element 336 glued together along their external edges, forming the winding mechanism 51b shown in cross-section in the FIG. 15a. In particular, in correspondence of the groove 332a, a circular pocket 339 is formed inside which the earphone cable flows and wraps.

Advantageously, according to the invention, both the hollow cylindrical base element 326 and the cover element 336 have respectively transversal grooves 340a and 340b merged to form a single common groove 340 from which the part of the cable 322b comes out and goes to the earphone 324. The FIG. 15b laterally shows the assembled winding mechanism 51b comprising the transversal common groove 340 useful to the passage outward of the earphone cable 322b.

Figure 17:
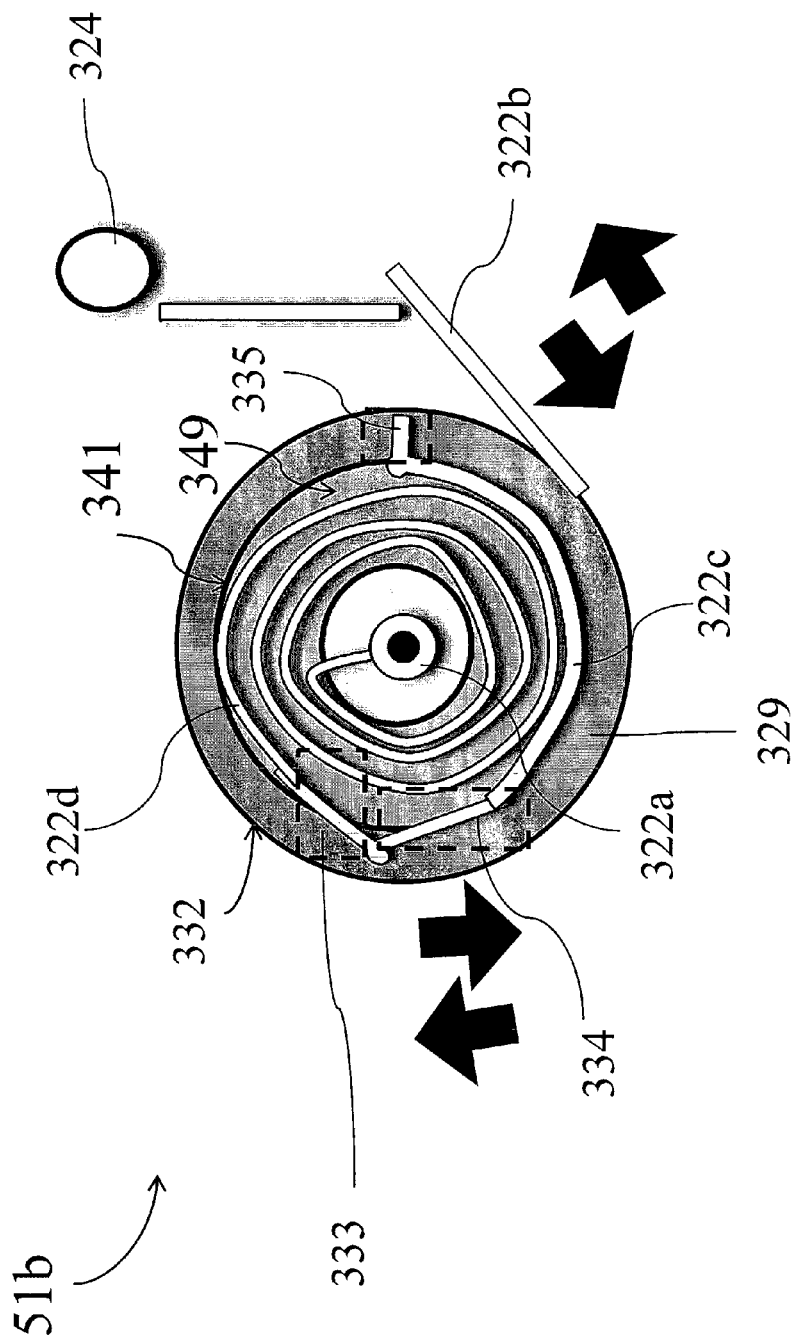
FIG. 17 shows a schematic top view of the winding mechanism of the earphone cables, according to the invention.

According to an aspect of the invention and without limitation, a circular spring 341, schematically shown in FIGS. 16 and 17, is being wrapped into the empty region of the winding mechanism 329 formed between the sliding element 329 and the cover element 336. The spring 341 enters from the pocket 339 through the opening 333 towards a region 349 internal to the sliding element 329 dedicated to the winding of the spring 341. One end of the spring 341 is constrained by means of the hole 334 to the sliding element 329, the spring 341 being inserted from the outside of the pocket 339 towards the inner winding region 349. The spring 341 coils within the inner winding region 349 into the sliding element 329 and is being constrained, at the other end, to the screw groove 328 present in the cylindrical protrusion 327. The part of the earphone cable passing through the hole 335 of the sliding element 329 is constrained, for a third portion 322c having a defined length going from the hole 335 to the point for the insertion of the spring 341 into the hole 334, internally to the sliding element 329, through an appropriate slot formed in the inner edge of a sliding element 329 or other type of binding means, not shown in the figure. For a fourth portion 322d of the earphone cable equal to the length of the spring 341, as shown in FIG. 16b, the cable is made integral with the spring 341 starting from an inserting point inside the inner region 349 in correspondence of the appropriate slot formed in the inner edge of the sliding element 329, and, in particular, starting from the hole 335 in the constraint point represented by the hole 334. The cable is made integral, for example, by locking it for its total extension inside a groove formed on the upper nest or shell edge of the spring 341 and forcing it to move integrally with the spring itself In the FIG. 16c the section view of the cable portion 322d inserted and blocked in the groove of the upper edge of the spring 341 is shown, the spring 341 being also shown in section view.

The remaining part of the cable, which is the second portion 322b extending towards the earphone 324, is wound outside of the edge 332 of the sliding element 329, inside the pocket 339, and can be unwound when a user pulls the earphone 324.

In use, when the spring 341 is completely wrapped inside the winding element 329 and the user pulls the earphone cable portion 322b wrapped outside of the edge 332 of the sliding element 329, this cable portion can unwound without tangling because the spring 341, with the integral cable portion 322d, is completely coiled inside the sliding element 329. When the user releases the cable portion 322b rewinding into the pocket 339, the spring 341 expands inside the sliding element 329 and remains in a stable position.

The FIG. 17 illustrates schematically the movement of the cable portions 322d and 322b and of the spring 341 during operation of the winding mechanism 51b. The cable portion coming out from the cylindrical protrusion 327 is the cable portion 322a coming out, through the hole 338, towards the plug 51a.

According to one aspect of the invention, the accessory 51 comprised in the housing system 300 may contain two separate winding mechanisms for each earphone cable.

According to a further aspect of the invention, the accessory 51 comprised in the housing system 300 may contain a single mechanism for winding a single earphone cable.

Figures 18, 18A, 18B:
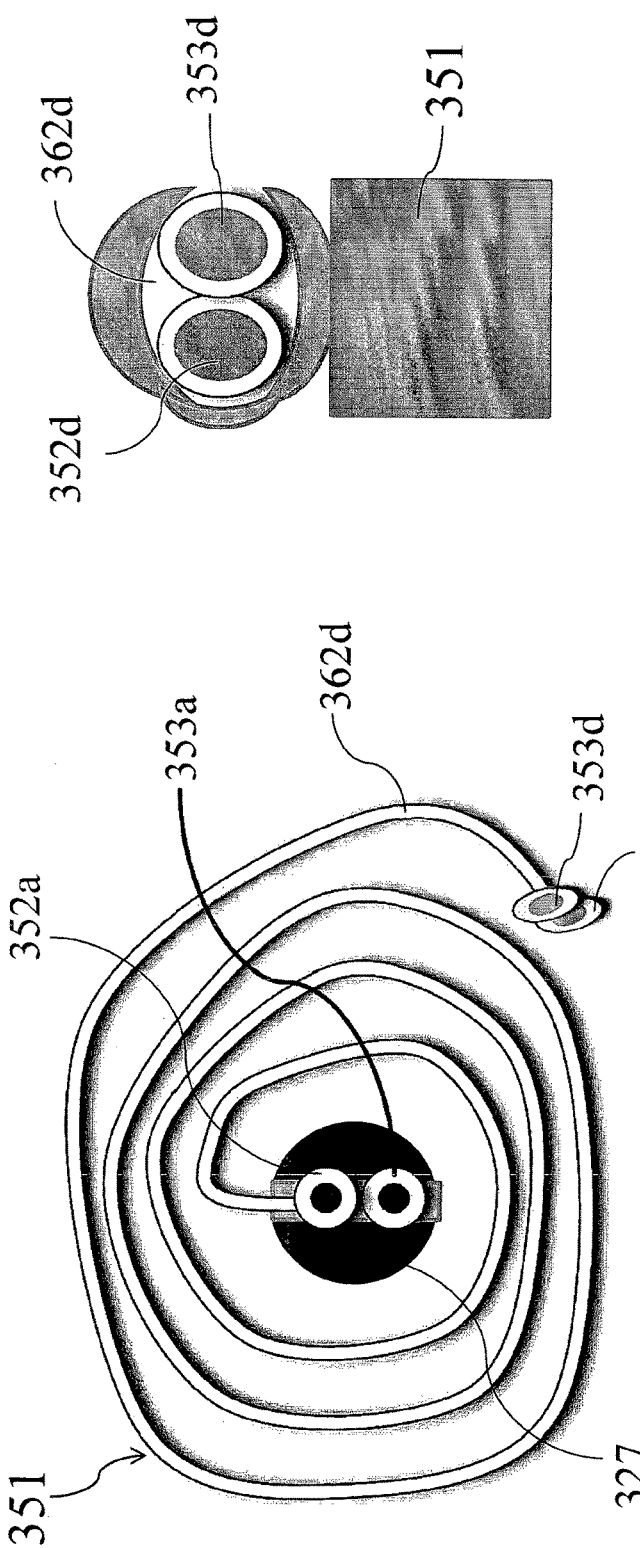
FIGS. 18a-18b show schematic top and section views of a double cable-spring system of a single mechanism for the winding of a double earphones cable, according to the invention.

According to another aspect of the invention, the accessory 51 comprised in the housing system 300 may contain a single mechanism for winding a double earphone cable that, after rewinding, reconstitute two separate earphones cables. Even in this case, the double cable is made integral with the upper edge of the circular spring, locking it inside its nest or shell structure. The FIG. 18a shows a spring 351 with a double cable 362, which comprises two earphone cables 352 and 353. In particular, the FIG. 18a shows the spring 351 with a portion 362d of the double cable engaged on the top shell edge of the spring 351. In the FIG. 18a, the section views of the portions of the cables 352a and 353a comprised in the double cable 362 in correspondence of the protrusion 327 are shown, the double cable 362 coming out from the winding mechanism and extending, for a portion 362a, to the plug 51a. The FIG. 18b shows the section views of the cables portions 352d and 353d comprised inside the portion 362d of the double cable engaged on the edge of the spring 351 and which extend to the earphones 324 and 325 by means of double cable portions, referred here as 362c and 362b and not shown in the figure.

Figure 19:
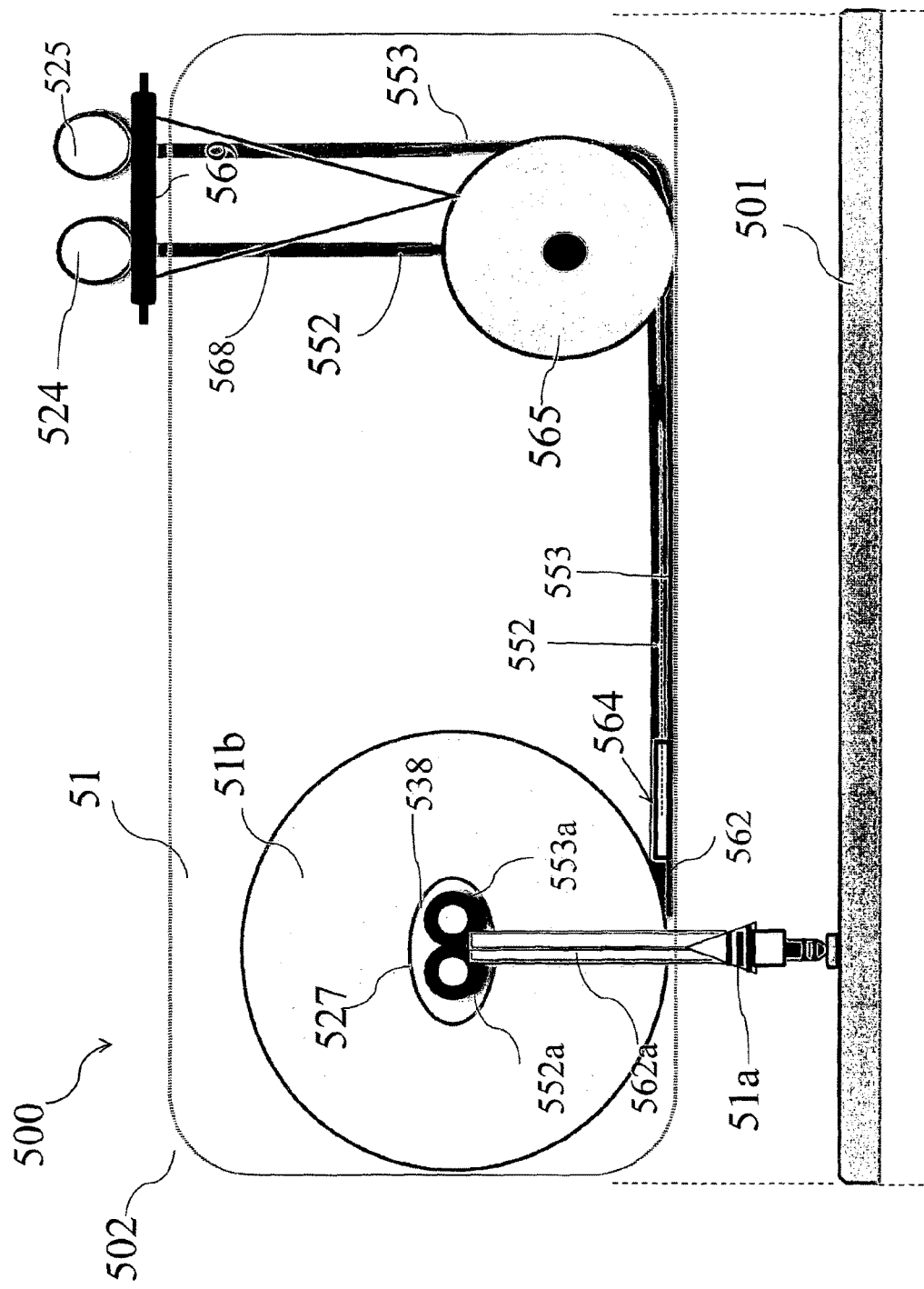
FIG. 19 shows a schematic section view of a housing for a single mechanism for winding a double earphone cable and of the mechanism itself, according to the invention.

The FIG. 19 shows an upper housing 502 of a housing system 500, for smart phone or tablet, comprising an accessory 51 with a single winding mechanism 51b for a double earphone cable 562 comprising two earphone cables 552 and 553. The portion 562a of the double cable, comprising the earphone cables portions 552a and 553a, the section views are shown in the FIG. 19, comes out of the protrusion 527 through the hole 538 of the winding mechanism 51b and extends to a plug 51a for connecting to the electronic device comprised in a central housing 501. Furthermore, the double cable portion 562 goes out from a groove of the winding mechanism 51b not shown in this figure. This double cable portion 562 extends up to a splitting point, in correspondence of a microphone 564. Thus, the double cable portion 562 splits into the two separate cables 552 and 553 which run together to wrap around an auxiliary sliding wheel 565 useful for winding the split cables 552 and 553. The separate cables 552 and 553 are channeled through a single suitable guide consisting in a conical casing 568. The cables 552 and 553 pass from this casing 568 over an auxiliary scrolling cylinder 569, integrated in the outer edge of the housing 502. In this way, the cables 552 and 553, ending on the earphones 524 and 525, protrude from the upper housing 502 without tangling and damaging due to the friction with the outer edge of the housing 502.

According to a further aspect of the invention, the microphone can be placed, within a microphone rigid rod, inserted in the conical casing comprising the portions of the earphone cables terminating in the earphones.

According to an aspect of the invention, the microphone can be integrated in only one of the two cables in the absence of a microphone rigid rod.

According to another aspect of the invention, the earphone cable can be single and the winding mechanism prevent its tangling. FIG. 20 shows this embodiment of the housing system. In this particular case, the cable portion 562b coming out from the winding mechanism 51b and directed toward a single earphone 534 passes through the auxiliary wheel 565 and comes to the casing 568 comprising a microphone rod rigid 564a. Finally, the cable 562b reaches the earphone 534 and sliding on the scrolling cylinder 569, integrated on the outer edge of the housing 502, can be easily extracted without any damage and wear.

The upper housing 502 also comprises a specific housing for the earphones 524 and 525, in the case of double earphone, or for only one of them, in the case of single earphone. In particular, the FIG. 21a shows a top view of the housing system 500 having the housing 502 provided with a specific compartment 516 adjacent to a central area or a right upper outer area of the profile of the edge of the housing system 500, on which earphones 524 and 525 are resting and that leaves movement freedom to the correspondent cable. The FIG. 21b shows a rear view of the upper part of the housing system 500. In this figure gripping elements 524a and 525a of the earphones 524 and 525 are shown. The compartment 516 allows the exit of the outside rear part of the earphones and allows their easy extraction.

Figures 22, 22A, 22B:
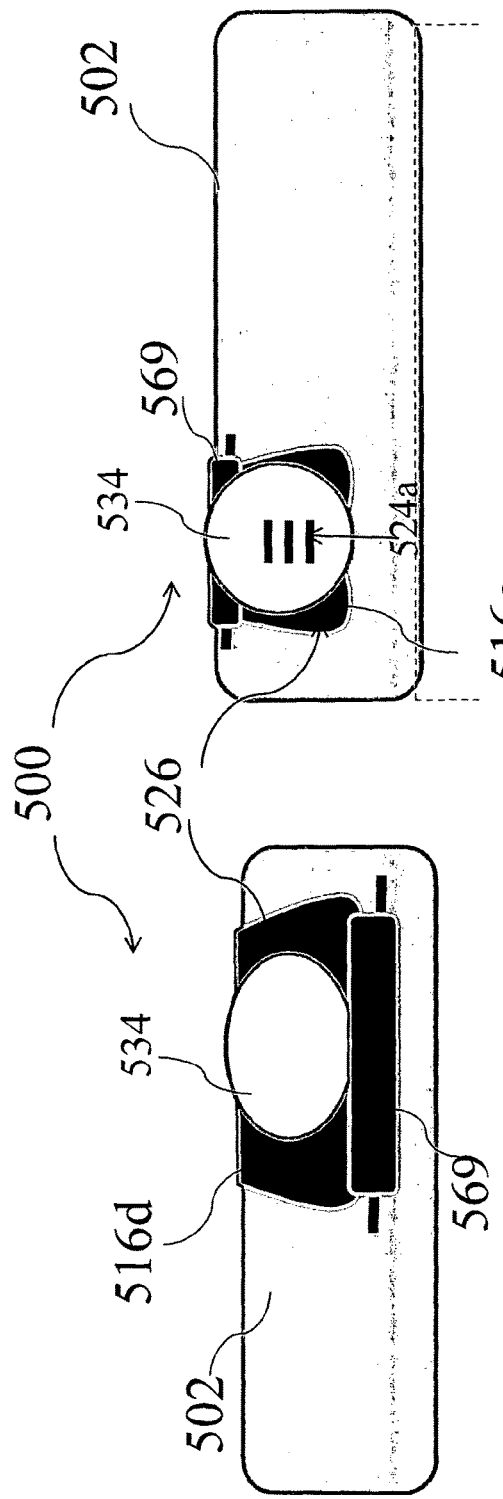
FIGS. 22a-22b show schematic three-dimensional top and rear views of the housing system of an electronic device provided with a single earphone, according to the invention.

In a similar manner, the FIG. 22 shows the top view and the rear view of a similar compartment 526 of the housing system 500 for a single earphone 534.

Advantageously, according to the invention, the housing of the power supply and of the winding mechanisms, according to any embodiments, do not reduce the size of the screen of the portable electronic device.

Advantageously, according to the invention, by placing the winding mechanism on the upper part and the power supply and the winding mechanism on the bottom, the screen size of the portable device can be reduced, increased or unchanged.

According to an aspect of the invention, the housing system for portable electronic devices and their accessories may comprise a further compartment for a second battery, in addition to the main one located inside the device.

Figure 23:
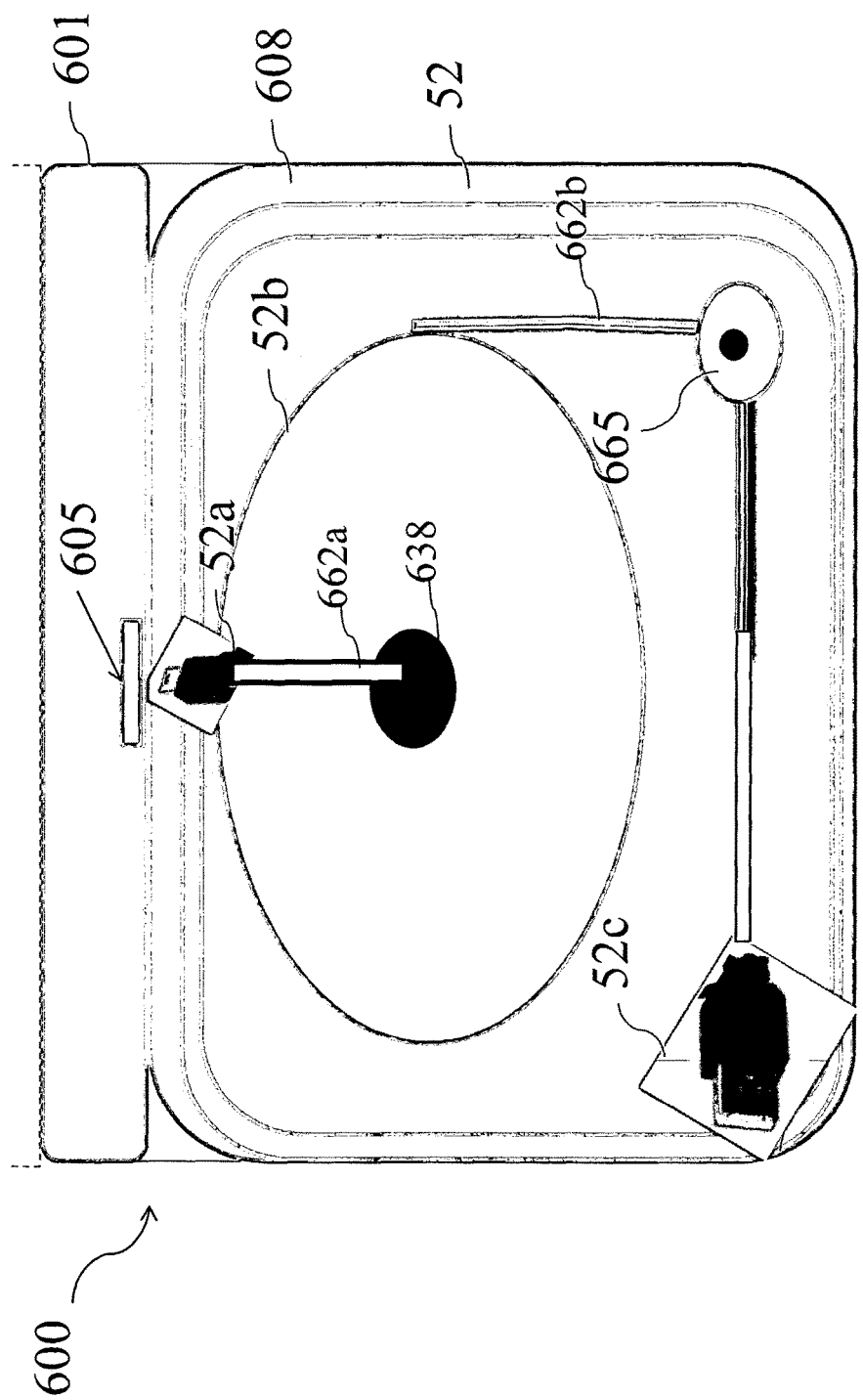
FIG. 23 shows a schematic section view of the housing system for portable electronic devices and related accessories provided with a winding mechanism of a USB cable, according to the invention.

Finally, as mentioned above, the housing system according to the invention may also contain an accessory comprising a winding mechanism of a USB cable. By way of example, the FIG. 23 shows the housing system 600 also comprising, in an central housing 608, an accessory 52 comprising a winding mechanism 61b of a USB cable with a micro USB port 52a for connection, via the USB cable 662a coming out from the hole 638 to the micro USB port 605, to the portable device 50 comprised in the upper housing 601. The winding mechanism 61b is realized as the described winding mechanism 51b and allows the passage of the USB cable 662b through an auxiliary wheel 665 to end outside with a USB port 52c.

Therefore, the housing system for portable electronic devices and related accessories is more compact, handy, modular and portable.

Another advantage of the housing system for portable electronic devices and related accessories consist in that it guarantees that the electronic devices are well protected from damages.

Moreover, the housing system for portable electronic devices and related accessories ensures the energy autonomy of these devices.

Another advantage consists in the fact that the winding mechanisms of the accessories cables of the portable device allow to manage, take and connect the portable device more easily.

Additionally, with the housing system according to the invention the heat dissipation ability of the portable electronic device can be increased thanks to the presence of rear holes in correspondence of the air intakes of the electronic device.

Finally it is clear that the housing system for portable electronic devices and related accessories described and illustrated here can be modified and varied without departing from the protective scope of the present invention, as defined in the appended claims.

The invention claimed is:

1. A housing system for portable electronic devices and their accessories comprising:
   a device housing for a portable electronic device;
   an accessory housing configured to house at least one of said accessories connectable to said portable electronic device via an automatic mechanical insertion / extraction mode, wherein the at least one of said accessories comprises:
   an earphone winding mechanism for an earphone cable of the portable electronic device, the cable including first, second, third, and fourth portions;
   a pin for connecting the first portion of the cable to the portable electronic device;
   a first earphone connected to said winding mechanism by the second portion of the cable which is able to be unwound by a user, wherein the winding mechanism includes:
   a hollow base element centrally comprising a protrusion that includes a central groove;
   a cover element with a base having a central hole corresponding to said protrusion and configured to allow exiting of the first portion of the cable;
   a central sliding element configured to allow sliding of said cable and including a base having a central hole, the sliding element being comprised between said hollow base element and said covering element so as to form a pocket in which said third portion of the cable can be wrapped, the sliding element including an edge having an exterior side on which the second portion can be wrapped, said third portion of the cable being fixed inside said sliding element, between a first hole and a second hole made in the edge, by a first groove comprised in an internal side of the edge of the sliding element;
   a spring positioned in an empty region of said winding mechanism, the empty region being located between said sliding element and said covering element, said spring extending in said empty region through an opening in said edge of the sliding element and having a first extremity extending through a third hole of said edge and fixed to the sliding element, a second extremity fixed to the central groove of said protrusion and, said spring having an upper edge with a second groove configured to house the fourth portion of the cable, the fourth portion being as long as the spring and integral with the spring; and
   a third groove configured to enable passage of said second portion of the cable from said winding mechanism to said first earphone, wherein the fourth portion is integral with the spring, starting from an inserting point inside the empty region corresponding to the second groove comprised in the internal side of the edge of the sliding element, from the third hole to the opening, said fourth portion being fit inside the second groove for all the length of the spring and being constrained to move integrally to the spring.

2. The housing system according to claim 1, wherein said earphone cable includes a microphone and first and second separated cables extending from the microphone, the first separated cable being connected to the first earphone and the second separated cable being connected to a second earphone, the earphone cable extending from the winding mechanism to an auxiliary mechanism configured to make easier sliding and splitting of said separated cables, to guide the separated cables into a single guide, and to block sliding of the separated cable past the auxiliary mechanism by not allowing said earphones into the auxiliary mechanism, the separated cables riding, during extraction, on a cylinder integrated into an upper edge of an exterior face of the housing system.

3. The housing system according to claim 1, comprising a USB winding mechanism for a USB cable that includes first and second USB cable portions, a first micro USB port, and a USB port, the first micro USB port being configured to mate with a second USB port of the housing and being connected to the portable device by the first USB cable portion which extends out of a hole of the USB winding mechanism, the second USB cable portion extending from the USB winding mechanism across a second auxiliary mechanism and ending at the USB port.

4. The housing system according to claim 1, wherein at least one of said accessories comprises a power adapter configured to provide power to the portable electronic device, and the accessory housing includes a compartment configured to house the power adapter.

5. The housing system according to claim 1, comprising a cover movable from a rear cover position of the housing system to a position for supporting the housing system on a plane, the cover comprising a photovoltaic layer and a connector configured to connect the cover to the housing system and contact power cables of a battery of the portable electronic device, the cover being coupled to an upper edge of the housing system via at least one pin so as to be rotatable through an angle comprised between 0° and 180°, the cover comprising edges internally grooved and configured to fit pins placed at the sides of the upper edge of the housing system so as to be slidable and rotatable through an angle comprised between 0° and 360° and to move from a rear cover position to a front cover position of the housing system.

6. A housing system for portable electronic devices and their accessories comprising:
   a device housing for a portable electronic device;
   an accessory housing configured to house at least one of said accessories connectable to said portable electronic device via an automatic mechanical insertion / extraction mode, wherein the at least one of said accessories comprises:
   an earphone winding mechanism for an earphone cable of the portable electronic device, the cable including first, second, third, and fourth portions;
   a pin for connecting the first portion of the cable to the portable electronic device;
   a first earphone connected to said winding mechanism by the second portion of the cable which is able to be unwound by a user, wherein the winding mechanism includes:

a hollow base element centrally comprising a protrusion that includes a central groove;
a cover element with a base having a central hole corresponding to said protrusion and configured to allow exiting of the first portion of the cable;
a central sliding element configured to allow sliding of said cable and including a base having a central hole, the sliding element being comprised between said hollow base element and said covering element so as to form a pocket in which said third portion of the cable can be wrapped, the sliding element including an edge having an exterior side on which the second portion can be wrapped, said third portion of the cable being fixed inside said sliding element, between a first hole and a second hole made in the edge, by a first groove comprised in an internal side of the edge of the sliding element;
a spring positioned in an empty region of said winding mechanism, the empty region being located between said sliding element and said covering element, said spring extending in said empty region through an opening in said edge of the sliding element and having a first extremity extending through a third hole of said edge and fixed to the sliding element, a second extremity fixed to the central groove of said protrusion and, said spring having an upper edge with a second groove configured to house the fourth portion of the cable, the fourth portion being as long as the spring and integral with the spring; and
a third groove configured to enable passage of said second portion of the cable from said winding mechanism to said first earphone, wherein said earphone cable includes a microphone and first and second separated cables extending from the microphone, the first separated cable being connected to the first earphone and the second separated cable being connected to a second earphone, the earphone cable extending from the winding mechanism to an auxiliary mechanism configured to make easier sliding and splitting of said separated cables, to guide the separated cables into a single guide, and to block sliding of the separated cable past the auxiliary mechanism by not allowing said earphones into the auxiliary mechanism, the separated cables riding, during extraction, on a cylinder integrated into an upper edge of an exterior face of the housing system.

7. A housing system for portable electronic devices and their accessories comprising:
a device housing for a portable electronic device;
an accessory housing configured to house at least one of said accessories connectable to said portable electronic device via an automatic mechanical insertion / extraction mode, wherein the at least one of said accessories comprises:
an earphone winding mechanism for an earphone cable of the portable electronic device, the cable including first, second, third, and fourth portions;
a pin for connecting the first portion of the cable to the portable electronic device;
a first earphone connected to said winding mechanism by the second portion of the cable which is able to be unwound by a user, wherein the winding mechanism includes:
a hollow base element centrally comprising a protrusion that includes a central groove;
a cover element with a base having a central hole corresponding to said protrusion and configured to allow exiting of the first portion of the cable;
a central sliding element configured to allow sliding of said cable and including a base having a central hole, the sliding element being comprised between said hollow base element and said covering element so as to form a pocket in which said third portion of the cable can be wrapped, the sliding element including an edge having an exterior side on which the second portion can be wrapped, said third portion of the cable being fixed inside said sliding element, between a first hole and a second hole made in the edge, by a first groove comprised in an internal side of the edge of the sliding element;
a spring positioned in an empty region of said winding mechanism, the empty region being located between said sliding element and said covering element, said spring extending in said empty region through an opening in said edge of the sliding element and having a first extremity extending through a third hole of said edge and fixed to the sliding element, a second extremity fixed to the central groove of said protrusion and, said spring having an upper edge with a second groove configured to house the fourth portion of the cable, the fourth portion being as long as the spring and integral with the spring; and
a third groove configured to enable passage of said second portion of the cable from said winding mechanism to said first earphone; and
a USB winding mechanism for a USB cable that includes first and second USB cable portions, a first micro USB port, and a USB port, the first micro USB port being configured to mate with a second USB port of the housing and being connected to the portable device by the first USB cable portion which extends out of a hole of the USB winding mechanism, the second USB cable portion extending from the USB winding mechanism across a second auxiliary mechanism and ending at the USB port.

8. The housing system according to claim 7, wherein at least one of said accessories comprises a power adapter configured to provide power to the portable electronic device, and the accessory housing includes a compartment configured to house the power adapter.

9. A housing system for portable electronic devices and their accessories comprising:
a device housing for a portable electronic device;
an accessory housing configured to house at least one of said accessories connectable to said portable electronic device via an automatic mechanical insertion / extraction mode, wherein the at least one of said accessories comprises:
an earphone winding mechanism for an earphone cable of the portable electronic device, the cable including first, second, third, and fourth portions;
a pin for connecting the first portion of the cable to the portable electronic device;
a first earphone connected to said winding mechanism by the second portion of the cable which is able to be unwound by a user, wherein the winding mechanism includes:
a hollow base element centrally comprising a protrusion that includes a central groove;
a cover element with a base having a central hole corresponding to said protrusion and configured to allow exiting of the first portion of the cable;

a central sliding element configured to allow sliding of said cable and including a base having a central hole, the sliding element being comprised between said hollow base element and said covering element so as to form a pocket in which said third portion of the cable can be wrapped, the sliding element including an edge having an exterior side on which the second portion can be wrapped, said third portion of the cable being fixed inside said sliding element, between a first hole and a second hole made in the edge, by a first groove comprised in an internal side of the edge of the sliding element;

a spring positioned in an empty region of said winding mechanism, the empty region being located between said sliding element and said covering element, said spring extending in said empty region through an opening in said edge of the sliding element and having a first extremity extending through a third hole of said edge and fixed to the sliding element, a second extremity fixed to the central groove of said protrusion and, said spring having an upper edge with a second groove configured to house the fourth portion of the cable, the fourth portion being as long as the spring and integral with the spring; and a third groove configured to enable passage of said second portion of the cable from said winding mechanism to said first earphone, wherein at least one of said accessories comprises a power adapter configured to provide power to the portable electronic device, and the accessory housing includes a compartment configured to house the power adapter.

10. A housing system for portable electronic devices and their accessories comprising:

a device housing for a portable electronic device;

an accessory housing configured to house at least one of said accessories connectable to said portable electronic device via an automatic mechanical insertion / extraction mode, wherein the at least one of said accessories comprises:

an earphone winding mechanism for an earphone cable of the portable electronic device, the cable including first, second, third, and fourth portions;

a pin for connecting the first portion of the cable to the portable electronic device;

a first earphone connected to said winding mechanism by the second portion of the cable which is able to be unwound by a user, wherein the winding mechanism includes:

a hollow base element centrally comprising a protrusion that includes a central groove;

a cover element with a base having a central hole corresponding to said protrusion and configured to allow exiting of the first portion of the cable;

a central sliding element configured to allow sliding of said cable and including a base having a central hole, the sliding element being comprised between said hollow base element and said covering element so as to form a pocket in which said third portion of the cable can be wrapped, the sliding element including an edge having an exterior side on which the second portion can be wrapped, said third portion of the cable being fixed inside said sliding element, between a first hole and a second hole made in the edge, by a first groove comprised in an internal side of the edge of the sliding element;

a spring positioned in an empty region of said winding mechanism, the empty region being located between said sliding element and said covering element, said spring extending in said empty region through an opening in said edge of the sliding element and having a first extremity extending through a third hole of said edge and fixed to the sliding element, a second extremity fixed to the central groove of said protrusion and, said spring having an upper edge with a second groove configured to house the fourth portion of the cable, the fourth portion being as long as the spring and integral with the spring; and a third groove configured to enable passage of said second portion of the cable from said winding mechanism to said first earphone; and a cover movable from a rear cover position of the housing system to a position for supporting the housing system on a plane, the cover comprising a photovoltaic layer and a connector configured to connect the cover to the housing system and contact power cables of a battery of the portable electronic device, the cover being coupled to an upper edge of the housing system via at least one pin so as to be rotatable through an angle comprised between 0° and 180°, the cover comprising edges internally grooved and configured to fit pins placed at the sides of the upper edge of the housing system so as to be slidable and rotatable through an angle comprised between 0° and 360° and to move from a rear cover position to a front cover position of the housing system.

11. The housing system according to claim 10, wherein said earphone cable includes a microphone and first and second separated cables extending from the microphone, the first separated cable being connected to the first earphone and the second separated cable being connected to a second earphone, the earphone cable extending from the winding mechanism to an auxiliary mechanism configured to make easier sliding and splitting of said separated cables, to guide the separated cables into a single guide, and to block sliding of the separated cable past the auxiliary mechanism by not allowing said earphones into the auxiliary mechanism, the separated cables riding, during extraction, on a cylinder integrated into an upper edge of an exterior face of the housing system.

12. The housing system according to claim 10, comprising a USB winding mechanism for a USB cable that includes first and second USB cable portions, a first micro USB port, and a USB port, the first micro USB port being configured to mate with a second USB port of the housing and being connected to the portable device by the first USB cable portion which extends out of a hole of the USB winding mechanism, the second USB cable portion extending from the USB winding mechanism across a second auxiliary mechanism and ending at the USB port.

13. The housing system according to claim 10, wherein at least one of said accessories comprises a power adapter configured to provide power to the portable electronic device, and the accessory housing includes a compartment configured to house the power adapter.

* * * * *